United States Patent
Bailey et al.

(10) Patent No.: US 8,783,066 B2
(45) Date of Patent: Jul. 22, 2014

(54) GLASS MOLDING SYSTEM AND RELATED APPARATUS AND METHOD

(75) Inventors: Darrel P Bailey, Big Flats, NY (US); John Harold Brennan, Horseheads, NY (US); Michael Joseph Dailey, Jr., Painted Post, NY (US); Scott Winfield Deming, Elmira, NY (US); Karl David Ehemann, Horseheads, NY (US); Keith Raymond Gaylo, Painted Post, NY (US); David Joseph Kuhn, Prattsburg, NY (US); Brian Christopher Sheehan, Elmira Heights, NY (US); Ljerka Ukrainczyk, Painted Post, NY (US); Kevin Lee Wasson, Elmira, NY (US); Yuriy Yurkovsky, Corning, NY (US)

(73) Assignee: Corning Incorporated, Corning, NY (US)

(*) Notice: Subject to any disclaimer, the term of this patent is extended or adjusted under 35 U.S.C. 154(b) by 63 days.

(21) Appl. No.: 13/480,172

(22) Filed: May 24, 2012

(65) Prior Publication Data

US 2012/0297828 A1    Nov. 29, 2012

Related U.S. Application Data

(60) Provisional application No. 61/490,923, filed on May 27, 2011.

(51) Int. Cl.
| | |
|---|---|
| *C03B 23/035* | (2006.01) |
| *F28F 13/06* | (2006.01) |
| *F28F 3/12* | (2006.01) |
| *C03B 23/025* | (2006.01) |
| *F28F 9/02* | (2006.01) |
| *C03B 23/023* | (2006.01) |

(52) U.S. Cl.
CPC .............. *C03B 23/0235* (2013.01); *F28F 13/06* (2013.01); *C03B 23/0357* (2013.01); *F28F 3/12* (2013.01); *C03B 23/0258* (2013.01); *F28F 9/026* (2013.01)
USPC .................... 65/106; 65/104; 65/107; 65/273

(58) Field of Classification Search
CPC ............ C03B 23/0252; C03B 23/0357; C03B 23/0352; C03B 23/0256; C03B 23/0254; C03B 23/027; C03B 23/0258; C03B 23/002
USPC ...................................... 65/103, 107; 432/249
See application file for complete search history.

(56) References Cited

U.S. PATENT DOCUMENTS

| | | | | |
|---|---|---|---|---|
| 2,682,730 | A | * | 7/1954 | Rossen ........................... 65/104 |
| 2,699,014 | A | * | 1/1955 | Van Steenis ...................... 65/55 |

(Continued)

FOREIGN PATENT DOCUMENTS

| | | |
|---|---|---|
| DE | 1000969 | 1/1957 |
| DE | 20208106 | 10/2002 |

(Continued)

OTHER PUBLICATIONS

Dejneka et al, U.S. Appl. No. 12/277,573 "Glasses Having Improved Toughness and Scratch Resistance".

(Continued)

*Primary Examiner* — Jason L Lazorcik
(74) *Attorney, Agent, or Firm* — Jason A. Barron

(57) ABSTRACT

A glass molding system and a method of making glass articles using the glass molding system are disclosed. The glass molding system includes an indexing table, a plurality of enclosures arranged along the indexing table, and a plurality of stations defined on the indexing table such that each of the stations is selectively indexable with any one of the enclosures. At least one radiant heater is arranged in at least one of the enclosures. A radiation reflector surface and a radiation emitter body are arranged in the at least one of the enclosures. The radiation emitter body is between the at least one radiant heater and the radiation reflector surface and has a first surface in opposing relation to the at least one radiant heater and a second surface in opposing relation to the radiation reflector surface.

16 Claims, 21 Drawing Sheets

(56) References Cited

U.S. PATENT DOCUMENTS

| | | | |
|---|---|---|---|
| 3,362,807 A * | 1/1968 | Wiley | 65/308 |
| 3,510,284 A * | 5/1970 | McMaster et al. | 65/25.4 |
| 3,560,183 A * | 2/1971 | Stilley et al. | 5/107 |
| 4,349,374 A * | 9/1982 | Rupp | 65/107 |
| 4,483,700 A | 11/1984 | Forker, Jr. et al. | |
| 4,746,348 A | 5/1988 | Frank et al. | |
| 4,836,838 A * | 6/1989 | Hirota et al. | 65/308 |
| 4,883,524 A * | 11/1989 | Bristol | 65/37 |
| 4,915,720 A * | 4/1990 | Hirota et al. | 65/64 |
| 5,019,689 A * | 5/1991 | Bollier et al. | 219/388 |
| 5,147,437 A * | 9/1992 | Bristol | 65/102 |
| 5,290,999 A * | 3/1994 | Kuster et al. | 219/388 |
| 5,340,399 A * | 8/1994 | Uftring et al. | 118/59 |
| 5,421,849 A * | 6/1995 | Hirota | 65/237 |
| 5,573,566 A * | 11/1996 | Anderberg et al. | 65/102 |
| 5,674,790 A | 10/1997 | Araujo | |
| 5,893,941 A | 4/1999 | Nikander | |
| 5,992,178 A * | 11/1999 | Kuster | 65/24 |
| 6,701,750 B2 * | 3/2004 | Maeda et al. | 65/103 |
| 7,000,430 B1 * | 2/2006 | Fotheringham et al. | 65/33.2 |
| 7,017,370 B1 * | 3/2006 | Fotheringham et al. | 65/33.2 |
| 7,216,510 B2 * | 5/2007 | Doehring et al. | 65/107 |
| 7,589,844 B2 * | 9/2009 | Hirata et al. | 356/601 |
| 7,666,511 B2 | 2/2010 | Ellison et al. | |
| 7,721,572 B2 * | 5/2010 | Taplan et al. | 65/107 |
| 8,077,460 B1 | 12/2011 | Dede et al. | |
| 8,336,334 B2 * | 12/2012 | Ross et al. | 65/107 |
| 8,429,937 B2 * | 4/2013 | Malach et al. | 65/107 |
| 8,443,628 B2 * | 5/2013 | Fredholm et al. | 65/64 |
| 8,448,470 B2 * | 5/2013 | Liu et al. | 65/106 |
| 8,573,005 B2 * | 11/2013 | Dannoux et al. | 65/106 |
| 2003/0177791 A1 * | 9/2003 | Neuman et al. | 65/103 |
| 2003/0177792 A1 * | 9/2003 | Longobardo et al. | 65/103 |
| 2003/0182966 A1 * | 10/2003 | Fotheringham et al. | 65/33.2 |
| 2004/0107731 A1 * | 6/2004 | Doehring et al. | 65/81 |
| 2004/0174540 A1 * | 9/2004 | Saito | 356/612 |
| 2004/0206123 A1 * | 10/2004 | Fotheringham et al. | 65/103 |
| 2005/0211427 A1 | 9/2005 | Kenny et al. | |
| 2005/0263273 A1 | 12/2005 | Crumly et al. | |
| 2006/0002087 A1 | 1/2006 | Bezama et al. | |
| 2006/0021744 A1 | 2/2006 | Vogel et al. | |
| 2006/0096738 A1 | 5/2006 | Kang et al. | |
| 2008/0316501 A1 * | 12/2008 | Hirata et al. | 356/601 |
| 2010/0000259 A1 * | 1/2010 | Ukrainczyk et al. | 65/104 |
| 2010/0077798 A1 * | 4/2010 | Fredholm et al. | 65/64 |
| 2010/0229602 A1 * | 9/2010 | Ross et al. | 65/107 |
| 2010/0281919 A1 * | 11/2010 | Bailey et al. | 65/29.19 |
| 2010/0316847 A1 * | 12/2010 | Schillert et al. | 428/174 |
| 2011/0072856 A1 * | 3/2011 | Davidson et al. | 65/61 |
| 2011/0126588 A1 * | 6/2011 | Malach et al. | 65/30.1 |
| 2011/0288803 A1 * | 11/2011 | Sonda | 702/84 |
| 2012/0216573 A1 * | 8/2012 | Dannoux et al. | 65/104 |

FOREIGN PATENT DOCUMENTS

| | | |
|---|---|---|
| DE | 20 2010012070 | 11/2010 |
| EP | 1492397 | 12/2004 |

OTHER PUBLICATIONS

Dejneka et al, U.S. Appl. No. 12/392,577 "Fining Agents for Silicate Glasses".

Dejneka et al, U.S. Appl. No. 12/856,840 "Zircon Compatible Glasses for Down Draw".

Barefoot et al, U.S. Appl. No. 12/858,490 "Crack and Scratch Resistant Glass and Enclosures Made Therefrom".

Bookbinder et al, U.S. Appl. No. 13/305,271 "Ion Exchangable Glass With Deep Compressive Layer and High Damage Threshold".

Dejneka et al, U.S. Appl. No. 61/503,734 "Ion Exchangeable Glass With High Compressive Stress".

DE20208106—machine translation—Printed Dec. 20, 2012.
DE202010012070—machine translation—Printed Dec. 21, 2012.

* cited by examiner

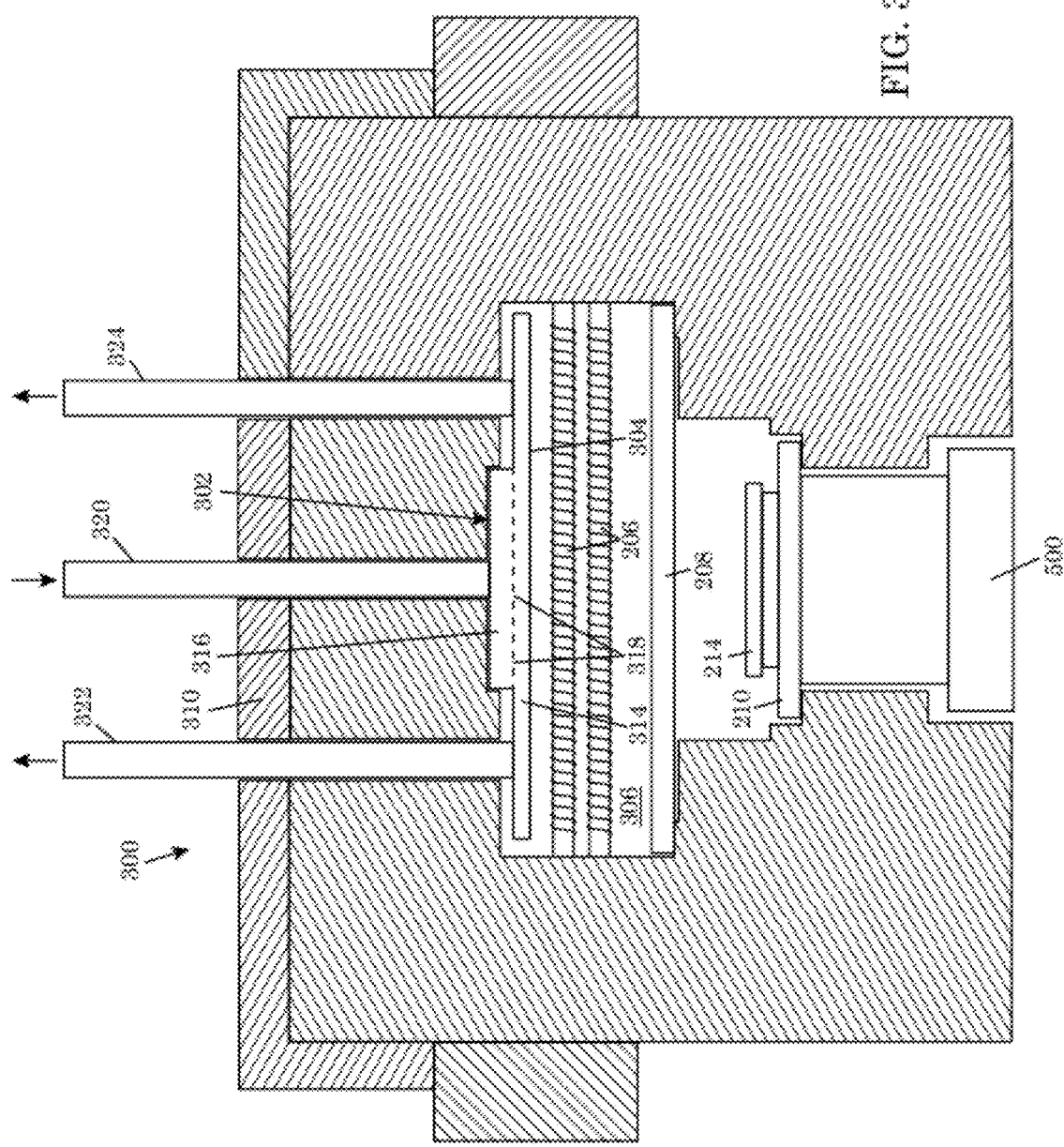

GLASS MOLDING SYSTEM AND RELATED APPARATUS AND METHOD

CROSS-REFERENCE TO RELATED APPLICATIONS

This application claims the benefit of priority under 35 U.S.C. §119 of U.S. Provisional Application Ser. No. 61/490,923 filed on May 27, 2011 the content of which is relied upon and incorporated herein by reference in its entirety.

TECHNICAL FIELD

The present invention relates generally to manufacture of three-dimensional (3D) glass articles by thermal reforming of two-dimensional (2D) glass sheets.

BACKGROUND

There is a large demand for 3D glass covers for portable electronic devices such as laptops, tablets, and smart phones. A particularly desirable 3D glass cover has a combination of a 2D surface, for interaction with a display of an electronic device, and a 3D surface, for wrapping around the edge of the display. The 3D surface may be an undevelopable surface, i.e., a surface that cannot be unfolded or unrolled onto a plane without distortion, and may include any combination of bends, corners, and curves. The bends may be tight and steep. The curves may be irregular. Such 3D glass covers are complex and difficult to make with precision using machining processes such as grinding and milling. Thermal reforming has been used to successfully form 3D glass articles from 2D glass sheets in other types of applications.

The present invention relates to a system that enables use of thermal reforming to make 3D glass covers such as described above. The present invention also relates to a process of forming a plurality of 3D glass articles with consistent shapes and high dimensional accuracy.

SUMMARY

In one aspect of the present invention, a glass molding system includes an indexing table, a plurality of enclosures arranged along the indexing table, and a plurality of stations defined on the indexing table such that each of the stations is selectively indexable with any one of the enclosures. At least one radiant heater is arranged in at least one of the enclosures. A radiation reflector surface is arranged in the at least one of the enclosures in opposing relation to the at least one radiant heater. A radiation emitter body is arranged in the at least one of the enclosures between the at least one radiant heater and the radiation reflector surface. The radiation emitter body has a first surface in opposing relation to the at least one radiant heater and a second surface in opposing relation to the radiation reflector surface.

In one embodiment, the glass molding system further includes a cooling apparatus disposed at least partially in the at least one of the enclosures and operable to remove heat from the radiation emitter body.

In one embodiment, the glass molding system further includes a plurality of molds and mold supports, each mold support configured to support one of the molds at one of the stations.

In one embodiment, the radiation reflector surface has an opening for receiving any one of the molds such that the radiation reflector surface circumscribes the mold.

In one embodiment, the area of the opening in the radiation reflector surface is less than an area of the second surface of the radiation emitter body.

In one embodiment, the glass molding system further includes a cooling plate for cooling any one of the molds. The cooling plate is configured to be mounted below the mold in a spaced-apart relation when the mold is supported at one of the stations by one of the mold supports.

In one embodiment, the cooling plate comprises a plate member having a first flow channel in which the cooling plate receives fluid, a second flow channel from which the cooling plate discharges fluid, and a barrier between the first flow channel and second flow channel that allows fluid to cross over from the first flow channel to the second flow channel at several points along an entire length of the second flow channel.

In one embodiment, the glass molding system further includes a heating apparatus arranged along the indexing table for preheating any one of the molds while the mold is at a station that is not indexed with any one of the enclosures. The configuration of the heating apparatus and arrangement of the heating apparatus relative to the indexing table is such that any of the stations can be indexed with the heating apparatus.

In one embodiment, the heating apparatus includes at least one radiant heater.

In one embodiment, the heating apparatus is configured to boost the temperature of any one of the molds by a predetermined amount in a single dwell of the indexing table.

In one embodiment, the glass molding system further comprises means for measuring a shape of a 3D glass article produced by any one of the molds.

In one embodiment, the measuring means comprises a measuring surface, support elements on the measuring surface for supporting the 3D glass article in a plane substantially parallel to the measuring surface, and at least one displacement gauge configured to measure a displacement of a point on the 3D glass article when the 3D glass article is supported by the support elements.

In one embodiment, the measuring means further includes means for aligning the 3D glass article on the measuring surface.

In one embodiment, the measuring means further comprises means for clamping the 3D glass article to the support elements.

In one embodiment, the glass molding system further includes means for loading 2D glass sheets onto the molds and means for unloading 3D glass articles from the molds.

In one embodiment, the glass molding system further comprises means for preheating the 2D glass sheets outside of the enclosures.

In one embodiment, each of the enclosures is a thermal enclosure provided by a housing having an insulated refractory wall.

In one embodiment, the at least one radiant heater is an infrared radiant heater.

In one embodiment, the radiation emitter body emissivity is greater than 0.8 and the radiation reflector surface emissivity is less than 0.4.

In one embodiment, the second surface of the radiation emitter body and the radiation reflector surface are spaced apart by a gap in a range from 10 mm to 50 mm.

In one embodiment, the radiation reflector surface is formed on the indexing table, and the indexing table is movable through the enclosures to position the radiation reflector surface in the at least one of the enclosures.

In one embodiment, the indexing table is a rotary indexing table.

In another aspect of the present invention, a method of making glass articles includes placing a 2D glass sheet on a mold having a mold surface with a 3D shape. The 2D glass sheet and mold are placed in a radiative environment, and the 2D glass sheet is heated to a first temperature between an annealing point and a softening point of the glass. While in the radiative environment, the 2D glass sheet is conformed to the mold surface by force to form a 3D glass article. The 3D glass article is held against the mold surface by force while bringing the temperature of the 3D glass article and mold to a second temperature. The force holding the 3D glass article against the mold is released. Then, the 3D glass article is rapidly cooled to a third temperature below a strain point of the glass.

In one embodiment, the force used in conforming the 2D glass sheet to the mold surface is greater than the force used in holding the 3D glass article against the mold surface.

In one embodiment, vacuum is applied between the mold surface and the 2D glass sheet or 3D glass article to generate each of the conforming and holding forces.

In one embodiment, the method further includes adjusting at least one process parameter to control the shape of the 3D glass article.

In one embodiment, adjusting at least one process parameter includes adjusting a temperature of the mold while releasing the force holding the 3D glass article against the mold.

In one embodiment, adjusting the temperature of the mold includes cooling of the mold. In one embodiment, the cooling is by radiative heat transfer.

In one embodiment, adjusting the temperature of the mold further includes determining a set of shape metrics that defines the characteristics of the shape of the 3D glass article.

In one embodiment, adjusting the temperature of the mold further includes determining an amount of heat to remove from the mold based on an accuracy of at least one shape metric of a 3D glass article produced previously by the mold.

In one embodiment, the cooling includes circulating a cooling fluid through a cooling plate, and determining the amount of heat to remove includes determining a flow rate at which the cooling fluid is supplied to the cooling plate.

In one embodiment, heating the 2D glass sheet in the radiative environment comprises using a radiation emitter body to emit radiation that is absorbed by the 2D glass sheet.

In one embodiment, the radiation emitter body absorbs radiation from at least one infrared radiant heater during heating of the 2D glass sheet in the radiative environment.

In one embodiment, bringing the 3D glass article and mold to the second temperature includes using a radiation emitter body to absorb heat from the 3D glass article.

In one embodiment, the method further includes removing heat from the radiation emitter body while the radiation emitter body is absorbing heat from the 3D glass article.

In one embodiment, the method further includes selectively delivering heat to the radiation emitter body to maintain the radiation emitter body at the second temperature while the radiation emitter body is absorbing heat from the 3D glass article.

In one embodiment, the method further includes separately preheating the 2D glass sheet and mold prior to placing the 2D glass sheet on the mold.

In another aspect of the present invention, a heat exchanger apparatus includes a main body, which includes a first flow channel and a second flow channel separated by a convoluted encircling wall. The convoluted encircling wall is configured such that fluid can pass from the first flow channel into the second flow channel over the convoluted wall. The main body further includes at least two flow channel ports, a first flow channel port through which fluid can be supplied into the first flow channel and a second flow channel port through which fluid can be discharged from the second flow channel. The main body further includes a flow distribution channel separate from the first and second flow channels. The flow distribution channel is in communication with the first flow channel and configured to distribute fluid to a plurality of points along a length of the first flow channel.

In one embodiment, the main body is in the form of a plate, and the heat exchanger apparatus further includes a front cover plate member covering a front side of the main body where the first flow channel, the second flow channel, and the convoluted wall are located. The covering provided by the front cover plate is such that a gap is formed between the front cover plate member and the main body where the convoluted wall is located.

In one embodiment, the heat exchanger apparatus further includes a plurality of spacers arranged between the main body and the front cover plate member to maintain the gap at a uniform height along the convoluted wall.

In one embodiment, the front cover plate member sealingly engages the main body to allow pressurizing of fluid in the first flow channel in order to enable the fluid in the first flow channel to pass into the second flow channel over the convoluted wall.

In one embodiment, the heat exchanger apparatus further comprises a back cover plate member covering a back side of the main body where the flow distribution channel is located. The back cover plate member has at least two flow ports, a first flow port for supplying fluid to the main body and a second flow port for withdrawing from the main body. The covering provided by the back cover plate member is such that the first flow port is in communication with the flow distribution channel and the second flow port is in communication with the second flow channel port.

In another aspect of the present invention, an apparatus for measuring a shape of an article includes a measuring surface and a plurality of supports arranged on the measuring surface for stably supporting the article. The apparatus further includes at least one alignment guide adjacent to the measuring surface and serving as a reference datum for placing the article relative to the measuring surface. The apparatus further includes at least one displacement gauge for measuring a displacement of a point on the article when the article is arranged on the supports.

In one embodiment, the at least one displacement gauge includes a non-contact displacement sensor.

In one embodiment, the non-contact displacement sensor is selected from a group consisting of a laser triangulation sensor, a spectral interference laser displacement sensor, and a confocal chromatic displacement sensor.

In one embodiment, the shape measuring apparatus further includes means for clamping the article to the supports.

In one embodiment, the clamping means includes axial holes in the supports through which vacuum can be applied to the article when the article is on the supports.

In one embodiment, the measurement surface is provided by a mounting block having at least one opening in which the at least one displacement gauge is arranged.

In one embodiment, the shape measuring apparatus includes means for clamping the at least one displacement gauge to the mounting block.

In another aspect of the present invention, an apparatus for measuring a shape of an article includes a first fixture for supporting the article, a second fixture arranged in opposing relation to the first fixture, and a plurality of displacement gauges supported along the second fixture in positions to measure displacements of a plurality of points on the article when the article is supported on the first fixture.

It is to be understood that both the foregoing general description and the following detailed description are exemplary of the present invention and are intended to provide a framework for understanding the nature and character of the present invention as it is claimed. The accompanying drawings are included to provide a further understanding of the present invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 3 is a cross-section of a heat transfer module incorporating an apparatus for cooling a radiative emitter body.

DETAILED DESCRIPTION

Figure 1:
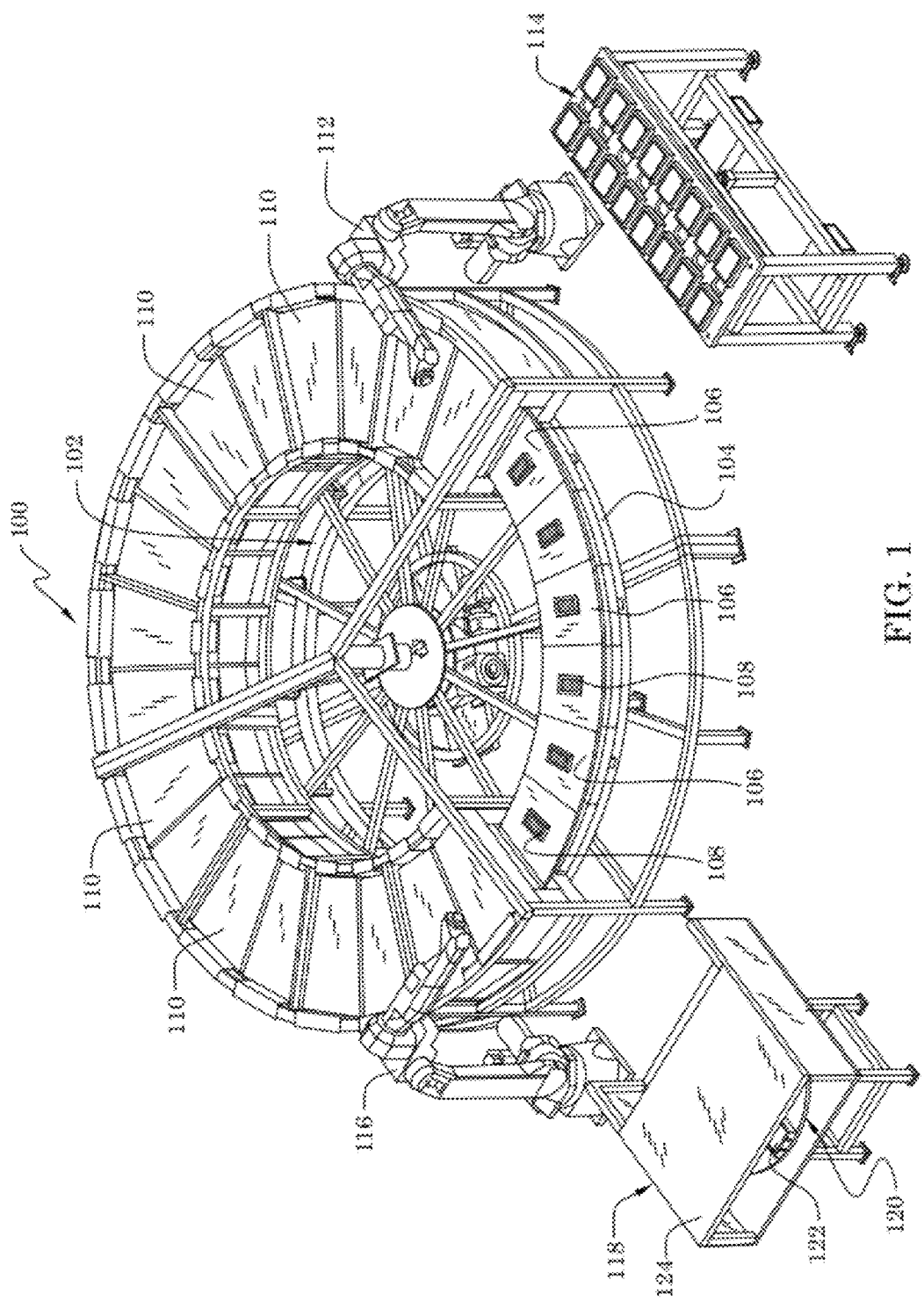
FIG. 1 is a perspective view of a glass molding system.

In the following detailed description, numerous specific details may be set forth in order to provide a thorough understanding of embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

FIG. 1 shows a glass molding system 100 for producing 3D glass articles from 2D glass sheets by thermal reforming. The glass molding system 100 includes a primary rotary table system 102 having a primary rotary indexing table 104. The primary rotary table system 102 can be any custom or commercial rotary table system capable of translating the primary rotary indexing table 104 along a circular or looped path through a selected rotational angle. In alternate embodiments, a non-rotary table system, such as a linear table system, with a non-rotary indexing table, such as a linear indexing table, may be used in lieu of a rotary table system with a rotary indexing table. Several stations 106 are defined on the primary rotary indexing table 104, and each station 106 includes a support for a mold 108. Heat transfer (HT) modules 110 are arranged along the primary rotary indexing table 104, and the primary rotary indexing table 104 can be rotated to allow each station 106 to be selectively indexed with any one of the HT modules 110. When a station 106 is indexed with a HT module 110, a mold 108 supported at the station 106 is disposed within the HT module 110, allowing a 2D glass sheet supported on the mold 108 to undergo at least a portion of a thermal reforming process within the HT module 110. Typically, the number of stations 106 will exceed the number of HT modules 110 so that only some of the stations 106 are indexed with HT modules 110 at any time. In the embodiment shown in FIG. 1, there are twenty-four stations 106 and eighteen HT modules 110, but there is plenty of leeway in selecting the number of stations 106 and HT modules 110 in the system. Each station 106 that is not indexed with a HT module 110 is typically open to the air to allow operations such as loading of a 2D glass sheet into a mold, unloading of a 3D glass article from a mold, cleaning of a mold, and repairing or replacement of a mold to be carried out.

Each cycle of the glass molding system 100 includes an indexing period followed by a wait period. During the indexing period, the primary rotary indexing table 104 is rotated by a selected rotational angle in a selected direction (which may be clockwise or counterclockwise), which results in a particular configuration of stations 106 being indexed with the HT modules 110. The rotational speed may be constant or varied during the indexing period. One example of a variation is an initial acceleration, followed by a steady speed, followed by a final deceleration. For the first cycle, it may be that only one of the stations 106 indexed with the HT modules 110 supports a mold 108 carrying a 2D glass sheet. After a few more cycles, all the stations 106 indexed with the HT modules 110 would each support a mold 108 carrying a 2D glass sheet or a mold 108 carrying a 3D glass article or an empty mold 108. Whether the mold 108 is carrying a 2D glass sheet or a 3D glass article or is empty would depend on the position of the mold 108 along the sequence of HT modules 110. During the wait period, thermal reforming of a 2D glass sheet into a 3D glass article is carried out at each station 106 that is indexed with a HT module 110. For continuous production, it may not be feasible to complete thermal reforming in a single HT module 110, in which case thermal reforming may be distributed among a series of HT modules 110.

A typical thermal reforming process involves heating the 2D glass sheet to a forming temperature, e.g., a temperature in a temperature range corresponding to a glass viscosity of $10^7$ Poise to $10^{11}$ Poise or between an annealing point and softening point of the glass, while the 2D glass sheet is on top of a mold. The heated 2D glass sheet may start sagging once heated. Typically, vacuum is then applied in between the glass sheet and mold to conform the glass sheet to the mold surface and thereby form the glass into a 3D glass article. After forming the 3D glass article, the 3D glass article is cooled to a temperature below the strain point of the glass, which would allow handling of the 3D glass article. For distributed thermal reforming, a segment of the HT modules 110 could be devoted to heating the 2D glass sheet to a forming temperature, another segment of the HT modules 110 could be devoted to forming the 2D glass sheet into the 3D glass article, and another segment of the HT modules 110 could be devoted to cooling the 3D glass article to a temperature below the strain point of the glass.

The cycle described above is repeated as many times as desired for continuous production of 3D glass articles from 2D glass sheets by thermal reforming. While the cycles are ongoing, additional activities are taking place such as unloading 3D glass articles from molds and loading new 2D glass sheets into empty molds. As the primary rotary indexing table 104 is rotated, each of the stations 106 supporting a mold 108 carrying a 3D glass article will eventually become exposed to the air, allowing access to the 3D glass article. A robot 112 may then be used to unload the 3D glass article from the mold 108 onto an unloading area 114. Also, a robot 116 may be used to load new 2D glass sheets from a loading area 118 onto the emptied mold 108. To enable a high throughput, the 2D glass sheets are preheated before being loaded onto the mold 108. For this purpose, the loading area 118 includes a secondary rotary indexing system 120, which includes a secondary rotary table 122. Several stations are defined on the secondary rotary indexing table 122, as in the case of the primary rotary indexing table 104. The secondary rotary indexing table 122 is disposed in a furnace 124. 2D glass sheets are first loaded onto the stations of the secondary rotary indexing table 122 and preheated in the furnace 124. In one embodiment, preheating of the 2D glass sheets includes flowing heated gas, such as nitrogen, over the 2D glass sheets. The 2D glass sheets are heated to a temperature below the forming temperature. The robot 116 then transfers the preheated 2D glass sheets onto the stations 106 of the primary rotary indexing table 104 for further heating and forming into 3D glass articles by thermal reforming. In one example, the secondary rotary indexing table 122 has six stations, but there is no particular restriction on how many stations may be defined on the secondary rotary indexing table 122. The robots 116, 112 may use vacuum or suction cups to grab the 2D glass sheets and 3D glass articles, respectively. The vacuum or suction cups or other means of grabbing the 2D glass sheets and 3D glass articles preferably should not scratch the glass, mar the glass, or leave residue on the glass.

The HT modules 110 do not need to be identical. Some of the HT modules 110 may be configured for active heating. Some of the HT modules 110 may be configured for active cooling. Some of the HT modules 110 may be configured to neither actively cool nor heat and may simply provide a stable thermal environment, e.g., via insulation, where a desired temperature may be maintained or allowed to drop slowly. Specific examples of HT modules that could be used as the HT modules 110 will be described below. In these specific examples, radiant heaters are preferably used for heating. However, other means of heating may be also used.

Figure 2:
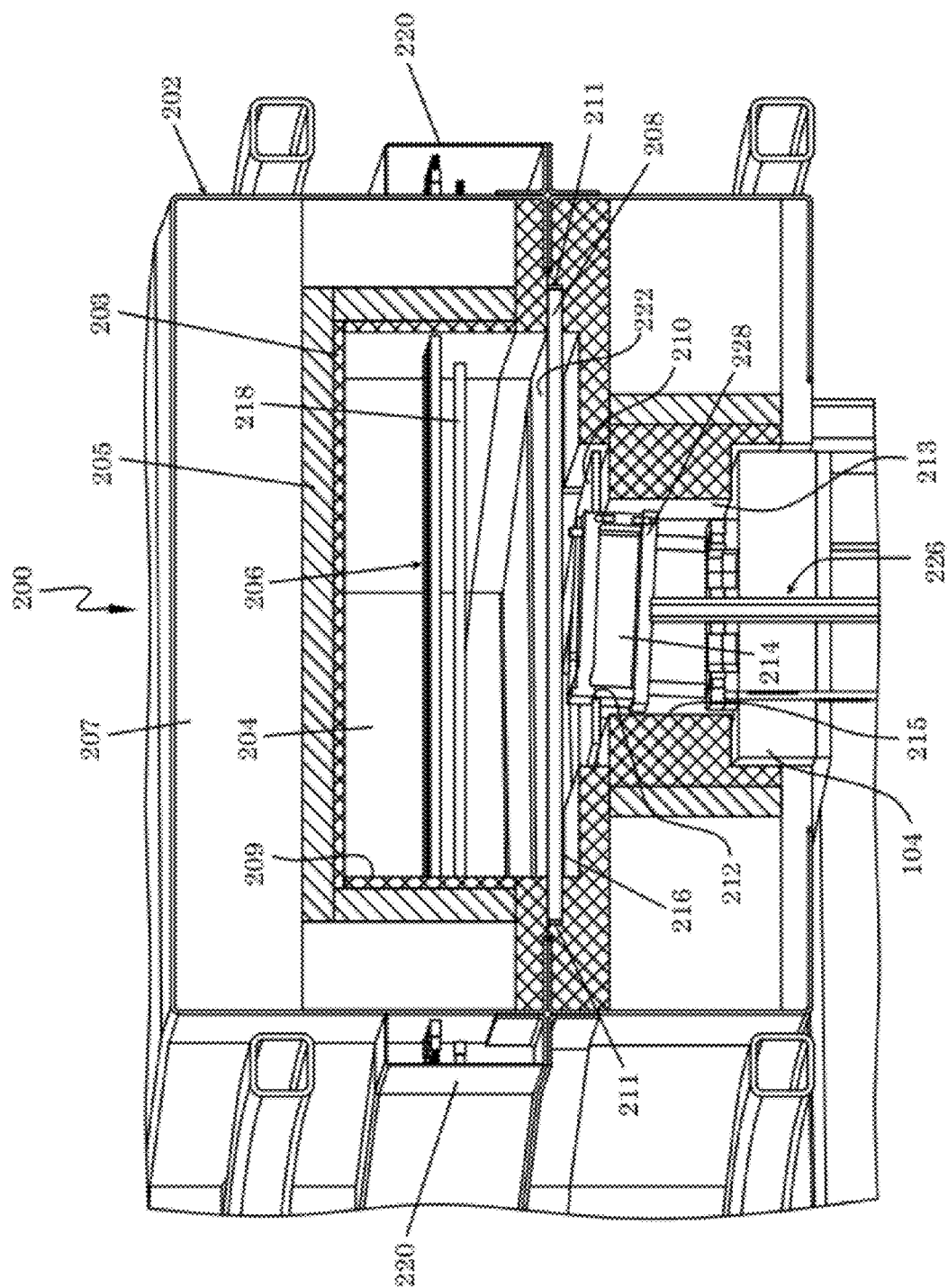
FIG. 2 is a cross-section of a heat transfer module.

FIG. 2 shows a HT module 200 that could be used as any one of the HT modules 110 described above. The heating module 200 includes a housing 202, which defines a thermal enclosure 204. A thermal enclosure is an enclosure that can maintain its contents at a temperature other than ambient. The wall of the housing 202 has a wall layer 203 made of a refractory material and surrounding the thermal enclosure 204, a wall layer 205 made of a refractory material and surrounding portions of the wall layer 203, and a wall layer 207 made of insulating material and surrounding the wall layers 203, 205. The insulated refractory wall of the housing 202 allows the temperature in the thermal enclosure 204 to be controllable. An array of heaters 206 is disposed in the upper portion 209 of the thermal enclosure 204. Preferably, the heaters 206 are radiant heaters. A radiant heater heats by radiant energy. Examples of radiant energy sources are microwaves, radio waves, visible light, infrared heat, and electricity. Preferably, the radiant heaters are infrared radiant heaters. The heaters 206 may also be resistive heaters in other embodiments. A radiation emitter body 208 is also disposed in the upper portion 209 of the thermal enclosure 204, below the array of heaters 206. The radiation emitter body 208 is a physical body that can emit or absorb radiation. In one embodiment, the radiation emitter body 208 is secured to the housing 202, for example, by inserting the ends of the radiation emitter body 208 into grooves 211 in the refractory layer 203 of the housing 202.

A radiation reflector surface 210 is disposed in the thermal enclosure 204, below the radiation emitter body 208. In one embodiment, the radiation reflector surface 210 is an integral part of the HT module 200, e.g., the radiation reflector surface 210 may be supported on a surface in the thermal enclosure 204 or secured to the wall of the housing 202. In this embodiment, the radiation reflector surface 210 would be stationary. In another embodiment, such as shown in FIG. 2, the radiation reflector surface 210 is provided by or formed on a surface of the indexing table 104. In this embodiment, the radiation reflector surface 210 would be capable of moving through the thermal enclosure 204 with the indexing table 104. The radiation reflector surface 210 has a receiving area, which is a designated area for receiving a mold, e.g., mold 214. In one embodiment, the receiving area of the radiation reflector surface 210 includes a receiving hole 212 sized to receive a mold, e.g., mold 214.

The lower portion 213 of the thermal enclosure 204 includes an opening 215 for running the indexing table 104 through the thermal enclosure 204. In FIG. 2, a station on the indexing table 104 has been indexed with the HT module 200 so that a mold 214 at the station is placed in the thermal enclosure 204. The mold 214 is also placed in the receiving hole 212 of the radiation reflector surface 210 that is arranged in the thermal enclosure 204. The placement of the mold 214 in the receiving hole 212 allows the radiation reflector surface 210 to surround a periphery of the mold 214. With this placement, the top of the mold 214 may or may not be flush with the radiation reflector surface 210.

The array of radiant heaters 206 emits radiation, which is received at the top surface 222 of the radiation emitter body 208 and absorbed into the radiation emitter body 208. Radiation is absorbed or emitted at the bottom surface 216 of the radiation emitter body 208, depending on the temperature of objects below the bottom surface 216. The operating temperature of the radiation emitter body 208 dictates the spectral energy that impinges on objects below the bottom surface 216. The array of radiant heaters 206 in combination with the radiation emitter body 208 provides a thermally-uniform heat source for mold 214 and glass carried by the mold 214. The radiation not absorbed by the mold 214 and glass is reflected back to the radiation emitter body 208 by the radiation reflector surface 210.

In one embodiment, the radiation reflector surface 210 is a flat surface. In one embodiment, the bottom surface 216 of the radiation emitter body 208 is flat and opposed to the radiation reflector surface 210. In one embodiment, the radiation reflector surface 210 and the bottom surface 216 of the radiation emitter body 208 are substantially parallel to each other. The radiation reflector surface 210 may be a surface of a plate or may be plating on any suitable surface, such as a surface of the indexing table 104. In one embodiment, the radiation reflector surface 210 is made of a refractory material, e.g., alumina-containing ceramic material available from ZIRCAR Refractory Composites, Inc. In one embodiment, the radiation reflector surface 210 has a relatively low emissivity, preferably an emissivity less than 0.4. In one embodiment, the radiation emitter body 208 is a plate. In one embodiment, the radiation emitter body 208 has a relatively high emissivity, preferably an emissivity greater than 0.8. Preferably, the emissivity of the radiation emitter body 208 is higher than that of the radiation reflector surface 210. An example of a suitable material for the radiation emitter body 208 is silicon carbide. The materials of the radiation emitter body 208 and the radiation reflector surface 210 should be appropriate for the high temperatures that would be encountered within the thermal enclosure 204, i.e., temperatures at which glass can be reformed.

To achieve an infinite parallel plate heat system, along with selecting the emissivity of the radiation reflector surface 210 to be low, e.g., less than 0.4, the area of the bottom surface 216 of the radiation emitter body 208 is selected to be much larger than the area of the receiving hole 212 in the radiation reflector surface 210 (or the area of the top of the mold 214). In one embodiment, the area of the bottom surface 216 of the radiation emitter body 208 is approximately 9 times larger than the area of the receiving hole 212 of the radiation reflector surface 210 (or the area of the top of the mold 214). The span of the bottom surface 216 of the radiation emitter body 208 may be greater than or approximately the same as the span of the radiation reflector surface 210. The radiation view factor of the system is preferably selected to maximize the efficiency of heat transfer of the system. This may be achieved in one embodiment by locating the top of the mold 214 (or the radiation reflector surface 210 which includes the receiving hole 212 for the mold 214) close to the bottom surface 216 of the radiation emitter body 208, preferably 10 mm to 50 mm from the bottom surface 216 of the radiation emitter body 208.

Additional radiant heaters 218 may be arranged between the plurality of radiant heaters 206 and the radiation emitter body 208 to provide additional heat to the radiation emitter body 208 where needed. For example, additional heat may be needed in portions of the radiation emitter body 208 near the periphery of the thermal enclosure 204. The additional radiant heaters 218 and the plurality of radiant heaters 206 are controlled to uniformly heat the radiation emitter body 208 so that the radiation emitter body 208 uniformly heats the glass and mold 214. The temperature of the radiation emitter body 208 or of the space between the heaters 206, 218 and the radiation emitter body 208 can be monitored using suitable temperature sensors, and the output of the sensors can be used to control the output of the heaters 206, 218.

The ends of the radiant heaters 206, 218 protrude through the wall of the housing 202 and are encased in perforated end plates 220 mounted on the exterior of the housing 202. These ends include electrical connectors for connection of the radiant heaters 206, 218 to an electrical source. To protect these electrical connectors, the perforations in the end plates 220 can be used to circulate cooling air around the electrical connectors.

A mold assembly 226 is shown at the opening 215. The mold assembly 226 extends into the opening 215 through a station of the indexing table 104. The mold assembly 226 includes the mold 214 mentioned above and a support 228 for the mold 214. The mold support 228 may incorporate a tilting stage for tilting the mold 214 while the mold 214 is received in the receiving hole 212 (or receiving area) of the radiation reflector surface 210 (the relevance of the tilting capability is that one method of aligning glass on the mold 214 requires that the mold 214 is tilted). A suitable positioning system attaches the mold support 228 to the indexing table 104 so that the mold assembly 226 can travel with the indexing table 104. The mold assembly 226 may further include a conduit (or conduits) for applying vacuum to the mold 214 and a conduit (or conduits) for applying gas around the mold 214. The gas applied around the mold 214 may be for cooling the 3D glass article on the mold after the 3D glass article has been formed. The details of the mold 214 are not disclosed here. Typically, the mold 214 would have a mold surface having a 3D profile that corresponds to the 3D shape of the glass article to be formed using the mold. The mold 214 would also have ports through which vacuum can be applied to the glass to draw the glass against the mold surface. The ports would open to the mold surface and be in communication with the conduit(s) for applying vacuum to the mold 214.

The HT module 200 may operate in a heating mode, where the radiation emitter body 208 is emitting radiation, or a cooling mode, where the radiation emitter body 208 is absorbing radiation. For a HT module 200 operating in a heating mode, the glass indexed into the heating HT module 200 will absorb radiation emitted by the radiation emitter body 208. This absorption will continue until one of two events occurs: (i) the temperature of the glass is about the same as that of the radiation emitter body 208 or (ii) the glass is indexed out of the HT module 200. For a HT module 200 operating in a cooling mode, the glass indexed into the cooling HT module 200 will emit radiation, which will be absorbed by the radiation emitter body 208. This emission will continue until one of two events occurs: (i) the temperature of the glass is about the same as that of the radiation emitter body 208 or (ii) the glass is indexed out of the cooling HT module 200.

FIG. 3 shows a HT module 300 that is essentially the HT module 200 (in FIG. 2) plus a cooling apparatus 302. That is, if the cooling apparatus 302 is not used, the HT module 300 will operate in the same manner as described above for HT module 200. The HT module 300 is more efficient for cooling glass than the HT module 200, as will be explained below. In explaining the configuration of the HT module 300, parts of the HT module 200 already described above will be reused.

The cooling apparatus 302 includes a cooling plate 304, which is arranged inside the thermal enclosure 306 of the HT module 300. The cooling plate 304 is between the radiant heaters 206 and the upper wall 310 of the HT module 300. The arrangement of the cooling plate 304 is such that there is a radiation view of the cooling plate 304 from the radiation emitter body 208. The cooling plate 304 has an internal chamber 314. A plenum 316 is formed above the cooling plate 304 for distributing fluid into the internal chamber 314 of the cooling plate 304. Pores 318 are provided in the portion of the cooling plate 304 adjacent to the plenum 316 for fluid communication between the plenum 316 and the internal chamber 314.

A fluid supply tube 320 extends through the roof 310 of the HT module 300 to the plenum 316 and is used to supply cooling fluid to the plenum 316. The cooling fluid in the plenum 316 is forced through the pores 318 of the cooling plate 304 into the internal chamber 314 of the cooling plate 304. The cooling fluid impinges on the inside wall of the cooling plate 304 in the form of jets. The impinging jets have the advantage of providing a large heat transfer over a small area. The cooling fluid is typically air, and the flow rate is typically less than 200 liters per minute. Two fluid discharge tubes 322, 324 extend through the roof 310 of the HT module 300 to the cooling plate 304 and are used to remove fluid from the internal chamber 314 of the cooling plate 304. The risk of particle contamination inside the thermal enclosure 306 from the cooling apparatus 302 is low because the cooling fluid is completely contained within the cooling apparatus 302. Preferably, the cooling fluid is a gas, such as air, so that if there is any leakage from the cooling apparatus 302 the leakage would not interfere with operation of the radiant heaters 206. The cooling fluid being completely contained within the cooling apparatus 302 also has the advantage of lowering the thermal gradients across the fluid tubes 320, 322, 324 so that the temperature across the cooling plate 304 is somewhat uniform.

For cooling of the glass, the radiant emitter body 208 has to be set at some temperature that will determine the temperature to which the glass on the mold 214 is to be cooled. As the radiation emitter body 208 absorbs radiation from the glass and mold 214 and radiation reflector surface 210, the temperature of the radiant emitter body 208 will increase. The purpose of the cooling apparatus 302 is to remove this excess heat from the radiation emitter body 208 so that the radiation emitter body 208 is at the desired set temperature. Without this cooling, the glass will end up at a higher temperature than desired. Achieving the proper temperature is one aspect of the cooling. Another aspect is to cool the glass in a controlled manner to avoid thermally-induced stresses that may later result in defects such as warpage in the glass. Controlled cooling of the glass is achieved in part by using the radiant heaters 206 to selectively deliver heat to the radiation emitter body 208 while using the cooling apparatus 302 to remove heat from the radiation emitter body 208. The amount of heat delivered to the radiation emitter body 208 is based on the temperature of the radiation emitter body 208 as it absorbs radiation and is being cooled by the cooling apparatus 302. The temperature of the radiation emitter body 208 may be monitored directly via measuring with temperature sensors or indirectly via measuring output of the heaters 206 and amount of heat removed by the cooling apparatus 302.

For maximum throughput and efficiency, the process of forming glass articles using the system of FIG. 1 involves cycling multiple molds through the system. For any given product, there will be an ideal shape for the glass articles to be formed. Some deviation from the ideal shape may be tolerated. For cover glass applications, the acceptable deviation will typically be very small, e.g., within +50 microns. Each mold can be designed to yield a glass article that has the ideal shape within the acceptable deviation. If all the molds cycled through the system are so designed and have the same heat transfer properties, then the glass articles they produce should have consistent shapes that match the ideal shape within the acceptable deviation. However, the molds will typically not have the same heat transfer properties due to variations in mold materials, coatings, or processing. These variations may come from the molds experiencing different number of cycles or from the molds being refurbished. The differences in heat transfer properties of the molds may appear, for example, as differences in mold surface emissivities or differences in interface conduction between the mold and glass.

The shape of a glass article is affected by thermal gradients in the glass when the glass is conformed to the mold. The thermal gradients in the glass are affected by the temperature of the mold, and the temperature of the mold is affected by the heat transfer properties of the mold. In one aspect of the present invention, mold temperature is controlled to compensate for differences in heat transfer properties of the molds so that the glass articles produced by the molds have consistent shapes. A heat exchanger placed below the mold is used to actively control mold temperature. The heat transfer between the heat exchanger and mold may be by conduction, convection, or radiation. In one embodiment, the heat exchanger is operated at an intermediate level to remove a predetermined amount of heat from the mold. Additional or less heat can be removed by adjusting the heat exchanger above or below the intermediate level. The general procedure for forming glass articles is to first establish a base process that produces glass articles with the desired shape. Then, deviations of the glass articles from the ideal shape are measured. The deviations are used to determine how much heat to remove from the molds during subsequent runs of the process.

Figure 4A:
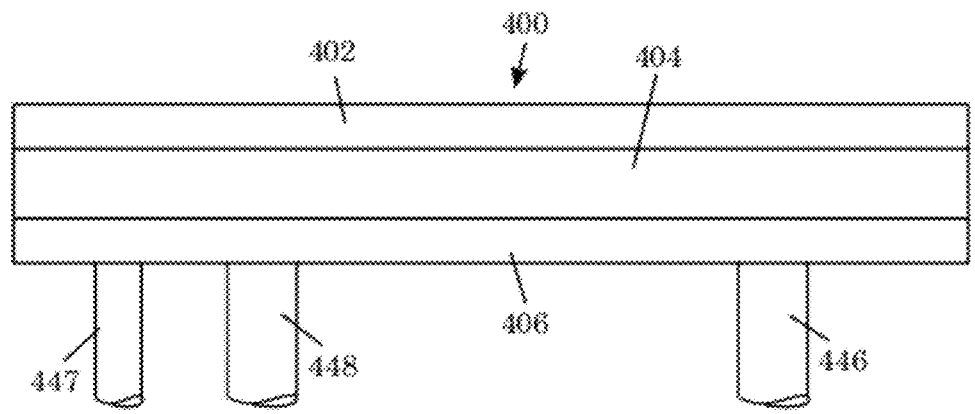
FIG. 4A is a side view of a cooling plate.

FIG. 4A shows a cooling plate (or heat exchanger) 400 that can be used to remove heat from a mold. In general, heat flux can be applied to the top surface of the cooling plate 400 by means of radiation, convection, or conduction. The cooling plate 400 will then act to remove that heat by dumping the heat to fluid circulating through its passages. Although the cooling plate 400 will be described in the context of cooling a mold, it is noted that the cooling plate 400 can be employed in other cooling applications, such as cooling of electronics such as computer chips.

Figure 4C:
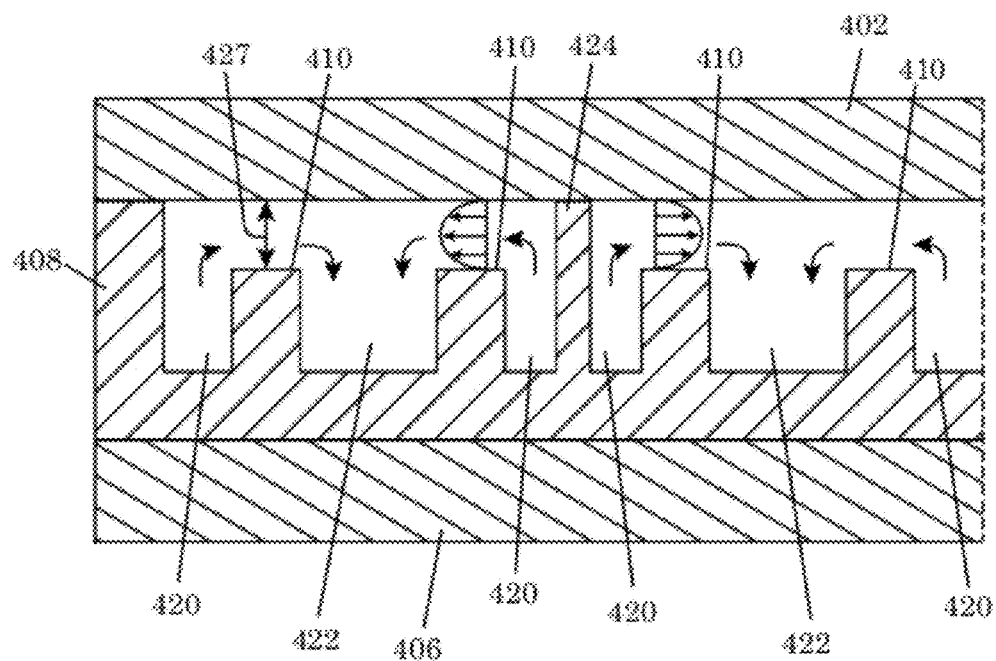
FIG. 4C is a cross-sectional view of the cooling plate of FIG. 4B along line 4C-4C.
Figure 4B:
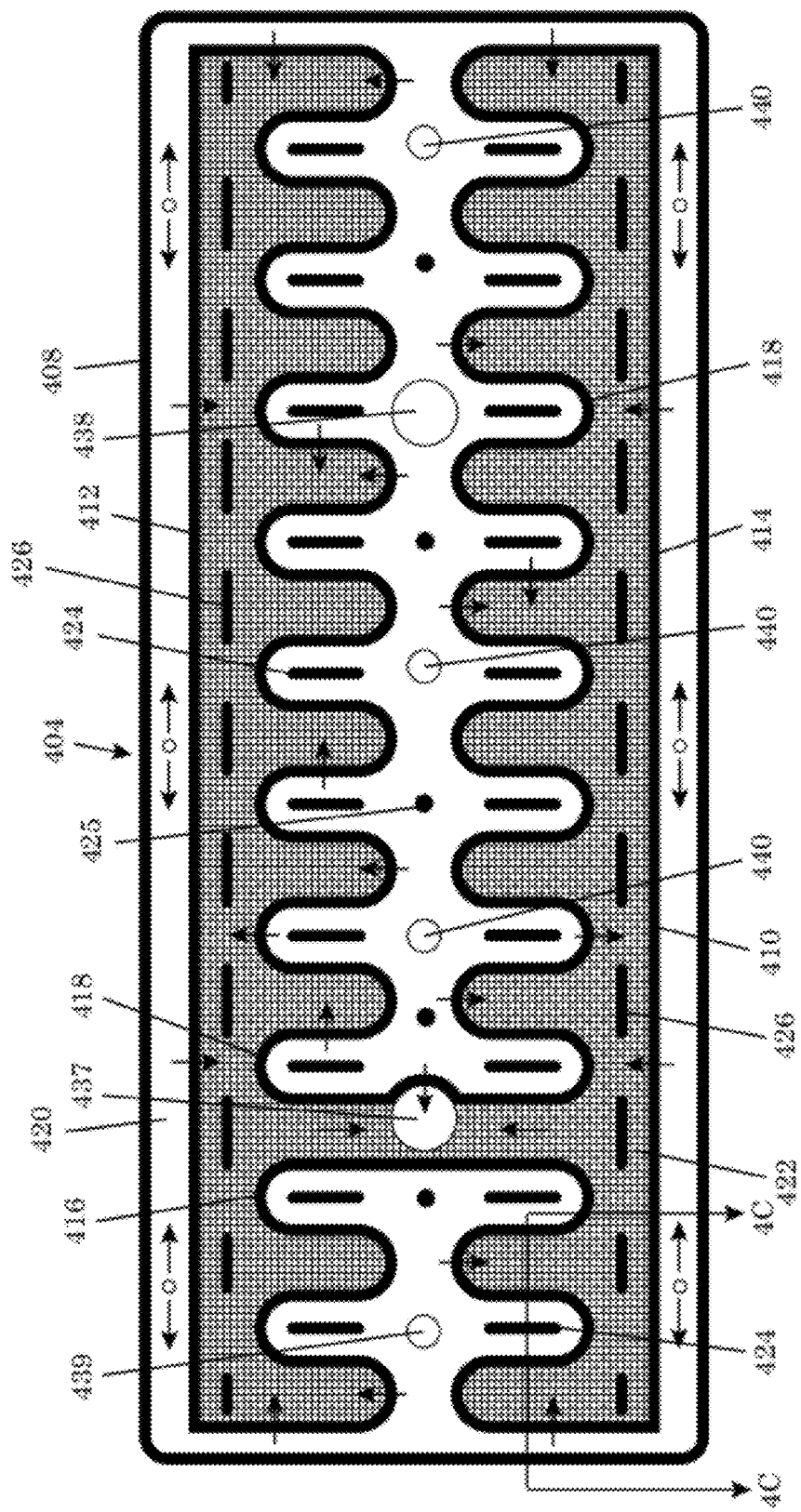
FIG. 4B is a top view of a middle plate of the cooling plate of FIG. 4A.

In one embodiment, the cooling plate 400 includes a top plate 402, a middle plate 404, and a bottom plate 406. The middle plate 404 contains the internal flow passages of the cooling plate 400. As shown in FIG. 4B, the middle plate 404 has an outer band (or outer raised area) 408 in the form of an encircling (or continuous) loop and an inner band (or inner raised area) 410 in the form of an encircling (or continuous) loop, with the outer band 408 circumscribing the inner band 410. The inner band 410 has straight band sections 412, 414, which are generally parallel to each other. The inner band 410 also has convoluted band sections 416, 418 connecting the straight band sections 412, 414. The convoluted band sections 416, 418 are made of U-shaped loops.

An inflow channel 420 is defined between the outer band 408 and the inner band 410, and an outflow channel 422 is defined within the inner band 410. Inflow spacers 424 are arranged in the inflow channel 420 within the U-shaped loops of the convoluted band sections 416, 418. Inflow spacers 425 are also arranged in the inflow channel 420 along the median of the middle plate 404. Outflow spacers 426 are arranged in the outflow channel 422 along the straight band sections 412, 414 or between the straight band sections 412, 414 and the convoluted band sections 416, 418. The outflow spacers 426 act as baffles to direct the path of the flow in the outflow channel 422.

The outer band 408 and spacers 424, 425, 426 are of the same height, whereas the inner band 410 is shorter than the outer band 408. When the top plate 402 is stacked on the middle plate 404 (as shown in FIG. 4A), the outer band 408 and spacers 424, 425, 426 contact and seal against the top plate 402. Simultaneously, a gap 427 (in FIG. 4C) is created between the top plate 402 and the middle plate 404 at locations corresponding to the inflow channel 420, outflow channel 422, and inner band 410. The spacers 424, 425, 426 maintain a fixed distance between the top plate 402 and the inner band 410, allowing the gap 427 to have a consistent height across the cooling plate 400. As shown in FIG. 4C, fluid can flow through the gap 427, crossing from the inflow channel 420, over the inner band 410, into the outflow channel 422. The inflow channel 420 has to be flooded to allow the fluid to cross over from the inflow channel 420 into the outflow channel 422. In this case, the inner band 410 serves as a restriction between the channels 420, 422. The resistance of the fluid flowing across gap 427 must be much greater than the resistance for the fluid to flow throughout the channel 420 or the resistance for the fluid to flow throughout the channel 422. Resistance is defined in engineering as the pressure drop a fluid experiences as it travels along a path divided by the flow rate of that fluid flowing along that path. If the resistance of fluid crossing the gap 427 is Rg, the resistance of fluid to flow along the length of the inflow channel 420 is Rs, and the resistance of fluid to flow along the length of the outflow channel 422 is Rd. Then, each of Rd and Rs should be much less than Rg, e.g., at least 10 times less. This will ensure a very uniform flow of fluid cross all regions of the gap 427. Uniform flow is required in order to produce uniform cooling and a uniform temperature of the cooling plate 400. It is also important to note that the pressure of the fluid in the inflow channel 420 is largely uniform. The majority of the pressure change in the fluid occurs as the fluid cross the gap 427.

Figure 4D:
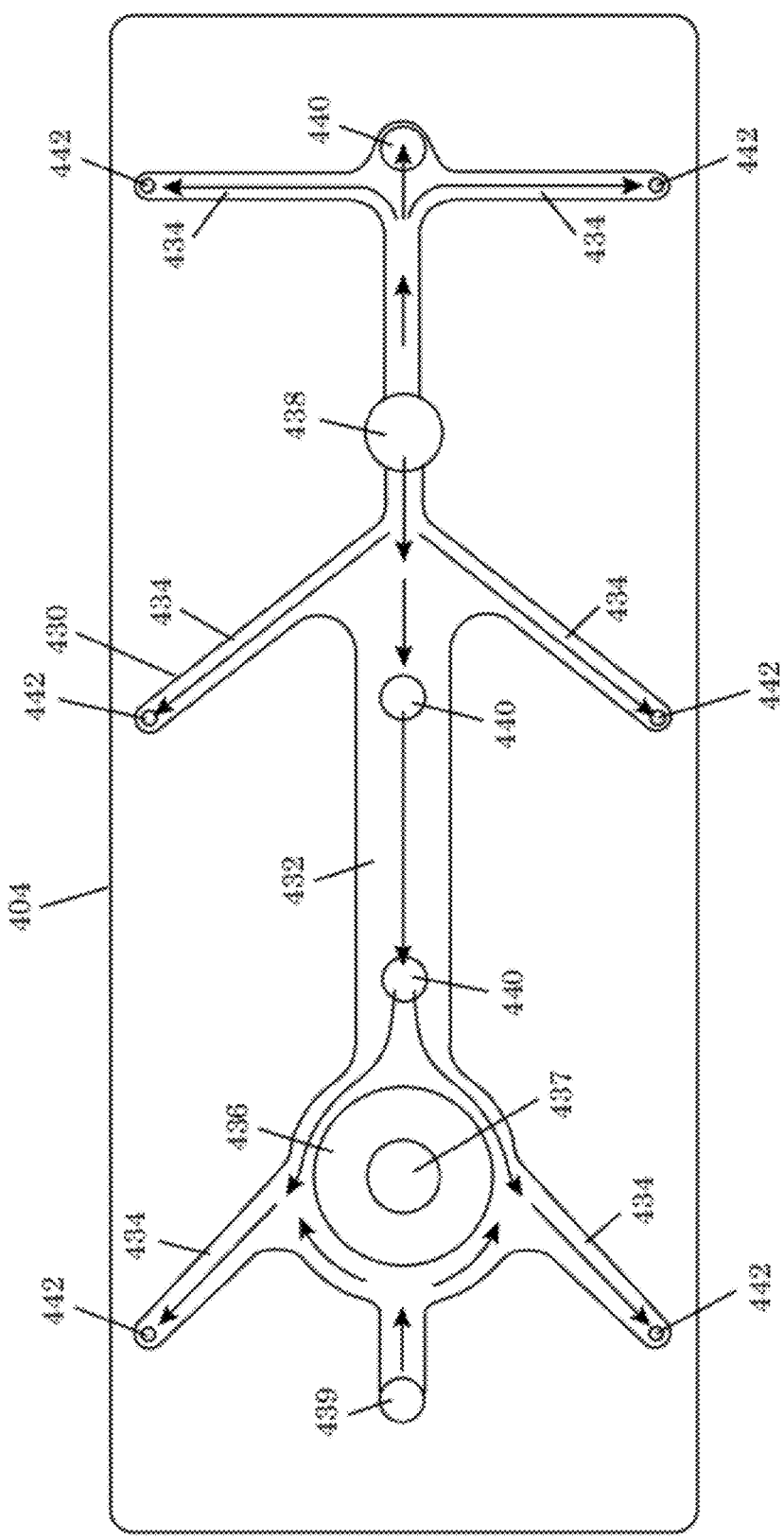
FIG. 4D is a bottom view of the middle plate of FIG. 4B.

FIG. 4D shows a network of supply channels (or flow distribution channel) 430 formed in the back of the middle plate 404. The network 430 includes a main supply channel 432, running generally along the median of the middle plate 404, and lateral supply channels 434 branching off the main supply channel 432. An island 436 is formed in the main supply channel 432. Fluid can move along the main supply channel 432 and around the island 436 to reach the lateral supply channels 434. A discharge hole 437 extends from the island 436 to the outflow channel 422 (in FIG. 4B). Main supply holes 438, 439 and crossover holes 440 are provided generally along the median of the main supply channel 432. The supply holes 438, 439, 440 extend from the back of the middle plate 404 to the inflow channel 420 (in FIG. 4B). Auxiliary supply holes 442 are provided along the periphery of the middle plate 404. The auxiliary supply holes 442 are located at the ends of the lateral supply channels 434 and extend from the back of the middle plate 404 to the inflow channel 420. The network 430 enables quick distribution of fluid to the inflow channel 420. As soon as fluid is delivered to the main supply holes 438, 439, the fluid will spread through the network 430 to the crossover holes 440 and peripheral supply holes 442 and then enter the inflow channel 420.

Figure 4E:
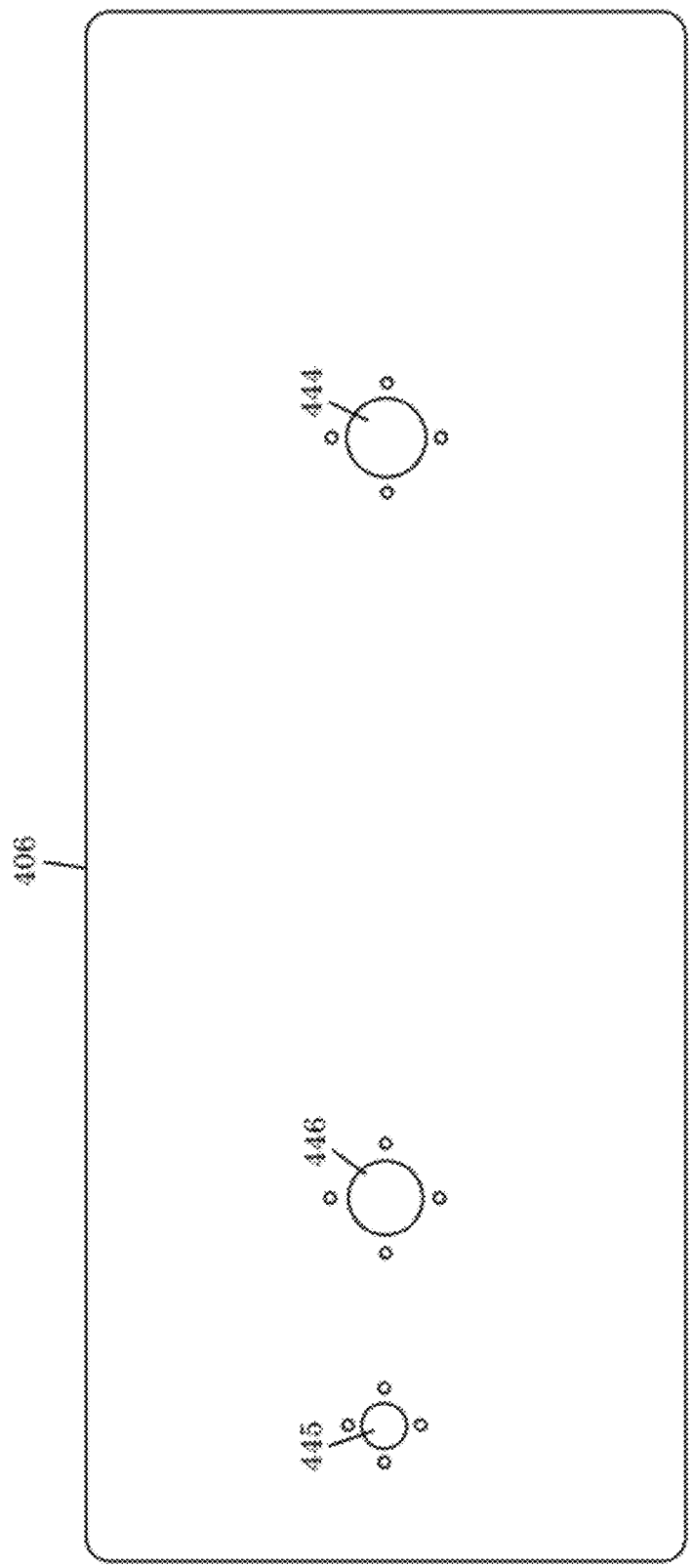
FIG. 4E is a top view of a bottom plate of the cooling plate of FIG. 4A.

The bottom plate 406 has supply holes 444, 445 (in FIG. 4E) and discharge hole 437 (in FIG. 4E). When the middle plate 404 is stacked on the bottom plate 406, the supply holes 444, 445 of the bottom plate 406 will be aligned with the main supply holes 438, 439 of the middle plate 406, and the discharge hole 437 of the bottom plate 406 will be aligned with the discharge hole 437 of the middle plate 404. In use, supply fluid tubes 446, 447 (in FIG. 4A) are coupled to the supply holes 444, 445 of the bottom plate 406, respectively, and a discharge fluid tube 448 (in FIG. 4A) is coupled to the discharge hole 437 of the bottom plate 406. Cooling fluid in the supply fluid tubes 446. 447 is delivered to the main supply holes 438, 439 and then distributed to the inflow channel 420 via the network 430. Preferably, the cooling fluid is gas, such as air. The fluid in the inflow channel 420 when at a sufficient level will cross over into the outflow channel 422 at several (infinitely many) points along the inner band 410. Fluid is discharged from the outflow channel 422 through the discharge hole 437 in the middle plate 404 and the discharge hole 437 in the bottom plate 406 into the discharge fluid tube 448.

The passages in the cooling plate have been designed such that the fluid will absorb as little heat as possible while in the inflow channel 420. If the fluid heats up as it travels along inflow channel 420, then it will result in a nonuniform temperature of cooling plate 400. It is preferred that the fluid heats up as it passes over the gap 427 (in FIG. 4C), where the flow is uniformly distributed. If fluid heats up as it passes over the gap 427, it will result in an overall uniform temperature of the cooling plate 400. The inflow channel 420 and gap 427 are sized such that most of the heat that the fluid absorbs occurs as the fluid passes over the gap 427. For example, the inflow channel 420 is larger than the gap 427 so that the inflow channel 420 has a lower convective heat transfer coefficient than the gap 427.

The middle plate 404 enables parallel distribution of fluid across the cooling plate 400. This parallel distribution has the net effect of minimizing temperature gradients across the cooling plate 400, which will allow the cooling plate 400 to provide uniform cooling to the mold. The network 430 and crossover holes 440 is designed to get the fluid to spread out to the inflow channel 420 with as little resistance as possible and with a temperature that is as close to the temperature of the inlet fluid, i.e., the temperature of the fluid supplied to the supply tube 446, as possible. If the middle plate 404 did not include the network 430 and the crossover holes 440, fluid would come into the main supply holes 438, 439 and into the inflow channel 420. The fluid would then spread out in the inflow channel 420. However, as the fluid is moving through the inflow channel 420, it will absorb heat from the walls of the middle plate 404. However, for uniform cooling and uniform temperature of the cooling plate 400, it is desirable to minimize the heat the fluid absorbs as it spreads through the inflow channel 420. By including the network 430 and the crossover holes 440, the relatively cold fluid can move more directly to the areas where it is needed, i.e., the entire periphery of the entrance to the gap 427, before it has a chance to heat up.

The plates of the cooling plate 400 are made of a material that has high thermal conductivity and good oxidation resistance and stability, i.e., does not break down or shed, at high temperature. Using a material with high conductivity promotes thermal uniformity of the cooling plate 400. In one example, the plates are made of nickel. In another example, the plates are made of copper, which is then coated with an oxidation resisting coating such as nickel or gold. The plates could also be made of a high temperature bronze material.

The plates of the cooling plate 400 can be assembled together using any suitable means. In one example, braze material such as a silver-based metal is used to assemble the plates together. The silver-based metal has a melting point higher than the maximum operating temperature of the plate assembly. The braze material is applied to the outer band 408 and spacers 424, 425, 426. The braze material forms a seal between the top plate 402 and the middle plate 404 at the locations of the outer band 408 and spacers 424, 425, and 426. The bond provided by the braze material allows the gap 427 to remain at a uniform distance all around the inner band 410, even when the inflow and outflow channels 420, 422 are filled with pressurized fluid. The fluid must necessarily be pressurized in the inflow channel 420 in order to force the fluid across the gap 427. The fluid is also at a pressure slightly above atmospheric pressure in the outflow channel 422 because there is a small pressure drop as the fluid flows through the outflow channel 422 and out of the discharge fluid tube 448.

Figure 5A:
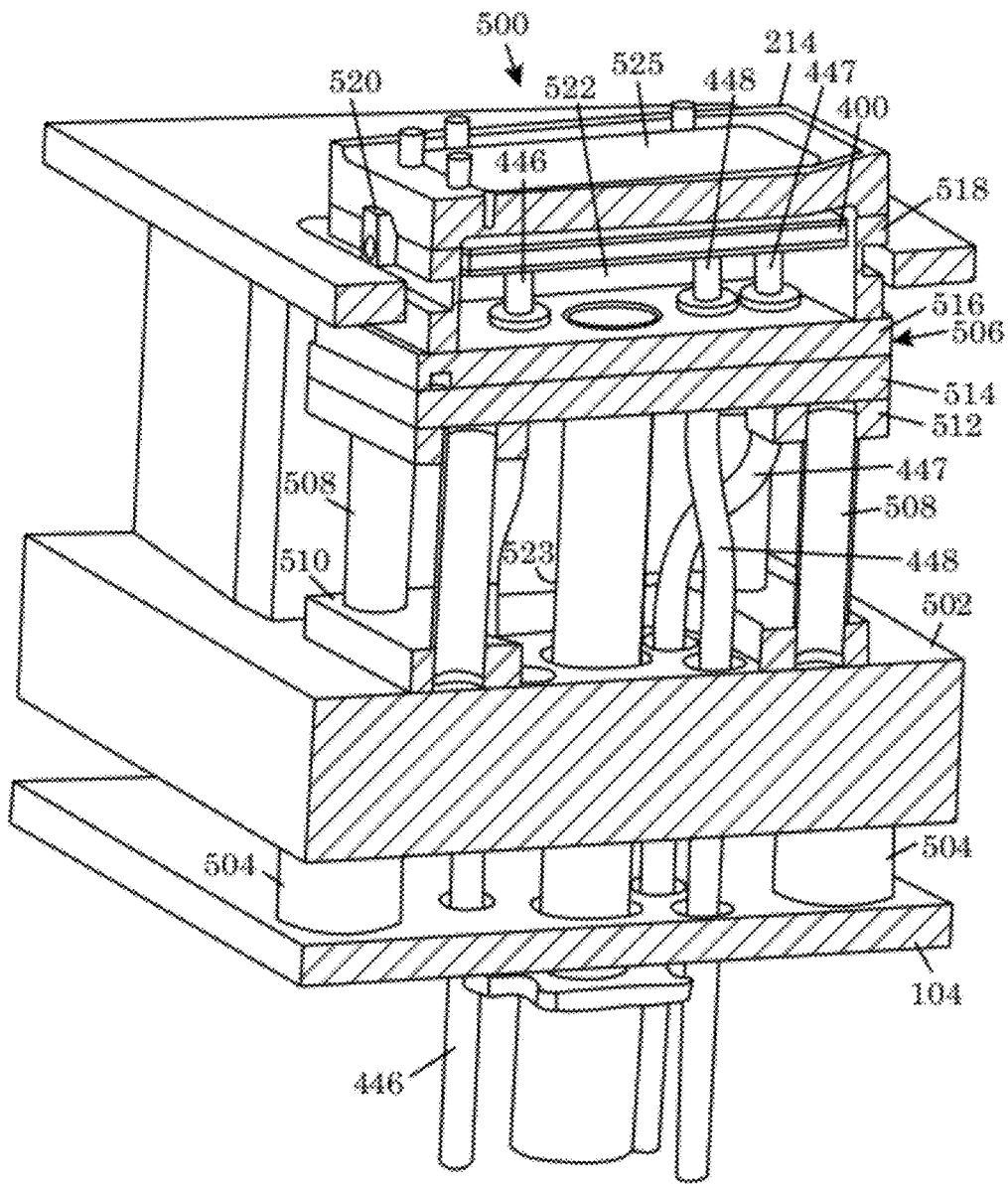
FIG. 5A is a cross-sectional view of a mold support system.

FIG. 5A shows a mold support system 500 that allows the cooling plate 400 to be placed below a mold while supporting the mold. The mold support system 500 can be be arranged at any station as shown at 500 in FIG. 3. The mold support system 500 includes a primary base 502 mounted on primary base standoffs 504 projecting upwardly from the indexing table 104. The primary base standoffs 504 are secured to the primary base 502 and indexing table 104 using any suitable means. A mold carrier 506 is supported above the primary base 502 by standoff tubes 508. The standoff tubes 508 are coupled to the primary base 502 via a standoff base 510 and to the mold carrier 506 via a standoff mounting block 512. The standoff tubes 508 are thin-walled to minimize conduction along their walls. The mold carrier 506 includes a base plate 516 and a plenum 518. An adapter plate 514 is attached at its bottom to the standoff mounting block 512 and at its top to the base plate 516. The plenum 518 is mounted on the base plate 516. The base plate 516 may have features such as pins on its top surface that engage features such as holes in the bottom surface of the plenum 518.

The mold 214 is mounted on the top surface of the plenum 518. In one embodiment, mold alignment tabs 520 are provided at the side of the plenum 518 to assist in aligning the mold 214 with the top surface of the plenum 518. In this embodiment, the mold 214 simply rests on the plenum 518, with only its weight holding it onto the plenum 518. A different method of aligning the mold 214 with the top surface of the plenum 518 may be used, such as locating pins on the top surface of the plenum 518 that engage holes in the bottom surface of the mold 214.

Figure 5B:
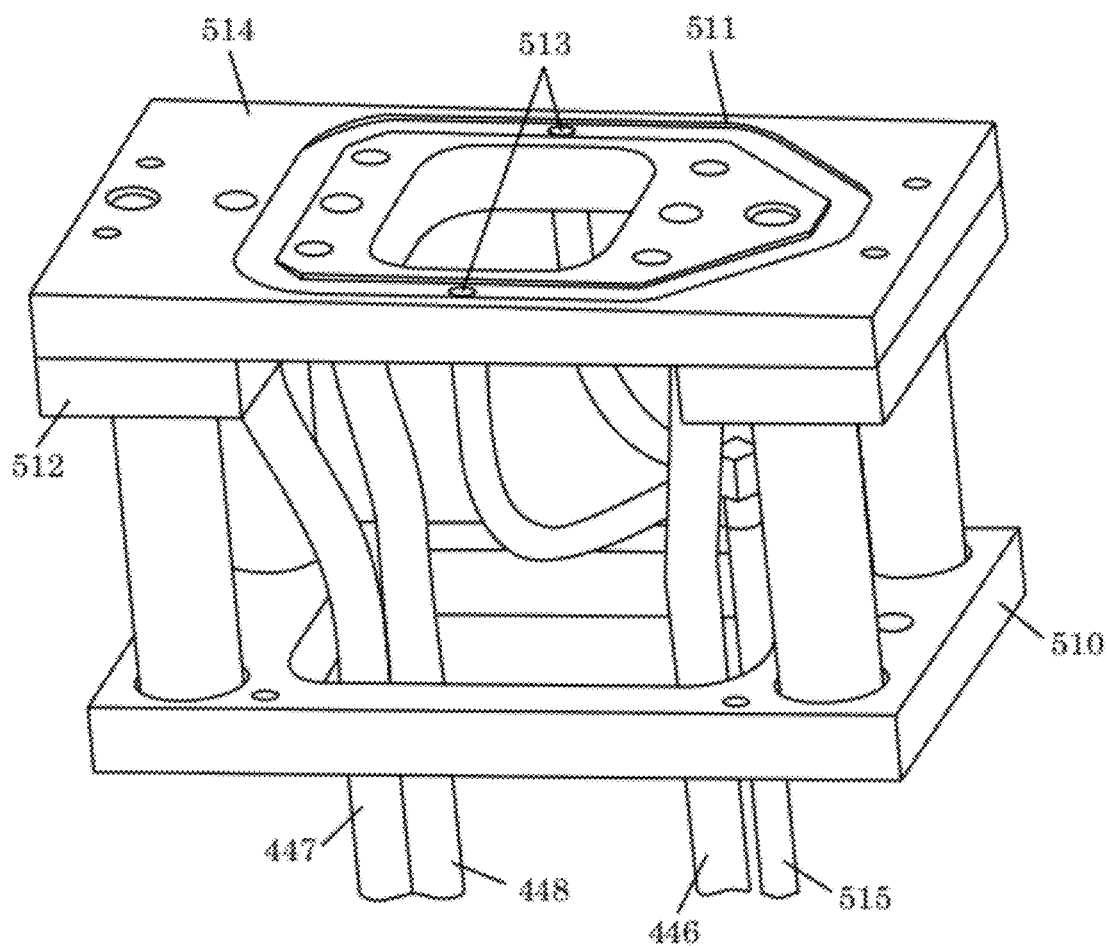
FIG. 5B is a perspective view of a subassembly of the mold support system of FIG. 5A.

In another embodiment, mold carrier 506, i.e., the base plate 516 and plenum 518, and the mold 214 are bolted together. Then, vacuum is used to clamp the mold carrier 506 down to the adapter plate 514. FIG. 5B shows the adapter plate 514 with a vacuum groove 511 and vacuum holes 513. The vacuum holes 513 are connected to a vacuum hold-down tube 515. Vacuum can be applied to the vacuum holes 513 and then the vacuum groove 511 via the vacuum hold-down tube 515. Vacuum in the vacuum groove 511 will clamp the base plate 516 to the adapter plate 514. The vacuum holes 513 in the adapter plate 514 may be connected to similar holes in the base plate 516 and plenum 518 so that vacuum can be applied to the underside of the mold 214 in order to clamp the mold 214 down to the mold carrier 506.

Returning to FIG. 5A, the plenum 518 provides a chamber 522, which is located between the bottom surface of the mold 214 and the top surface of the base plate 516. A service tube 523 passes through the indexing table 104, primary base 502, adapter plate 514, and base plate 516. The service tube 523 is exposed at the top surface of the base plate 516 to the chamber 522. The service tube 523 can be used to perform services within the chamber 522. For example, the service tube 523 can be used to provide vacuum in the chamber 522. The vacuum provided in the chamber 522 can be applied in between the mold 214 and the glass 525 on the mold 214 via vacuum hole(s) in the mold 214. The service tube 523 can also be used to deliver a gas to the chamber 522. In this case, holes run from the bottom surface of the mold 214 to the top surface of the mold 214. The holes will be exposed to the chamber 522. By leaving a gap between the cooling plate 400 and the bottom surface of the mold 214, the gas that enters the chamber 522 is allowed to disperse and go through the holes in the mold 214. When the glass 525 is sitting on the top surface of the mold 214, the gas can be supplied to the interface between the glass 525 and mold 214 in order to lift the glass off the mold, e.g., after the glass has been reformed.

The cooling plate 400 is located at the top of the chamber 522 and below the mold 214. Preferably, the cooling plate 400 is in close proximity, but not in physical, contact with the mold 214. This would allow heat transfer from the mold 214 to the cooling plate 400 to occur primarily by radiation. For radiative heat transfer, there should be a path of radiation between the cooling plate 400 and the mold 214. Separating the cooling plate 400 from the mold 214 allows the design of the mold 214 to be independent of the design of the cooling plate 400, or vice versa. This would ultimately reduce the manufacturing cost of the mold.

Supply standoff tubes 446, 447 and discharge standoff tube 448 pass through the indexing table 104, primary base 502, adapter plate 516, and base plate 516 and are connected to the cooling plate 400. The tubes 446, 447, 448 serve to pass cooling fluid to and from the cooling plate 400. The tubes 446, 447, 448 are thin-walled tubes that have high resistance to heat conduction that occurs between the cooling plate 400 and base plate 516. By having high heat conduction, the cooling plate 400 is thermally isolated such that its temperature can be easily adjusted by varying the flow rate of cooling fluid to it. The mold 214 can also be thermally isolated to allow its temperature to be adequately controlled by the cooling plate 400.

Typically, the temperature of the cooling plate 400 is maintained at an intermediate value by circulating fluid through the cooling plate 400 at an intermediate flow rate. The temperature of the cooling plate 400 can be adjusted by increasing or decreasing the flow rate of the circulating fluid from the intermediate flow rate. As the temperature of the cooling plate 400 is adjusted, the temperature of the mold 214 will be adjusted. For example, the temperature of the cooling plate 400 can be reduced by increasing the flow rate of the circulating fluid, which would lead to an increase in radiative heat transfer from the mold 214 to the cooling plate 400 and a corresponding decrease in the temperature of the mold 214. Conversely, the temperature of the cooling plate 400 can be increased by decreasing the flow rate of the cooling fluid circulated through the cooling plate 400, which would lead to a decrease in radiative heat transfer from the mold 214 to the cooling plate 400 and a corresponding increase in the temperature of the mold 214. Heat removal from the mold 214 will be relatively uniform due to the design of the internal passages of the cooling plate 400 that minimize temperature gradients across the cooling plate 400. The cooling plate 400 allows the cooling fluid to remove heat as effectively as possible such that a known mass of cooling fluid produces a deterministic and repeatable amount of cooling.

Figure 6A:
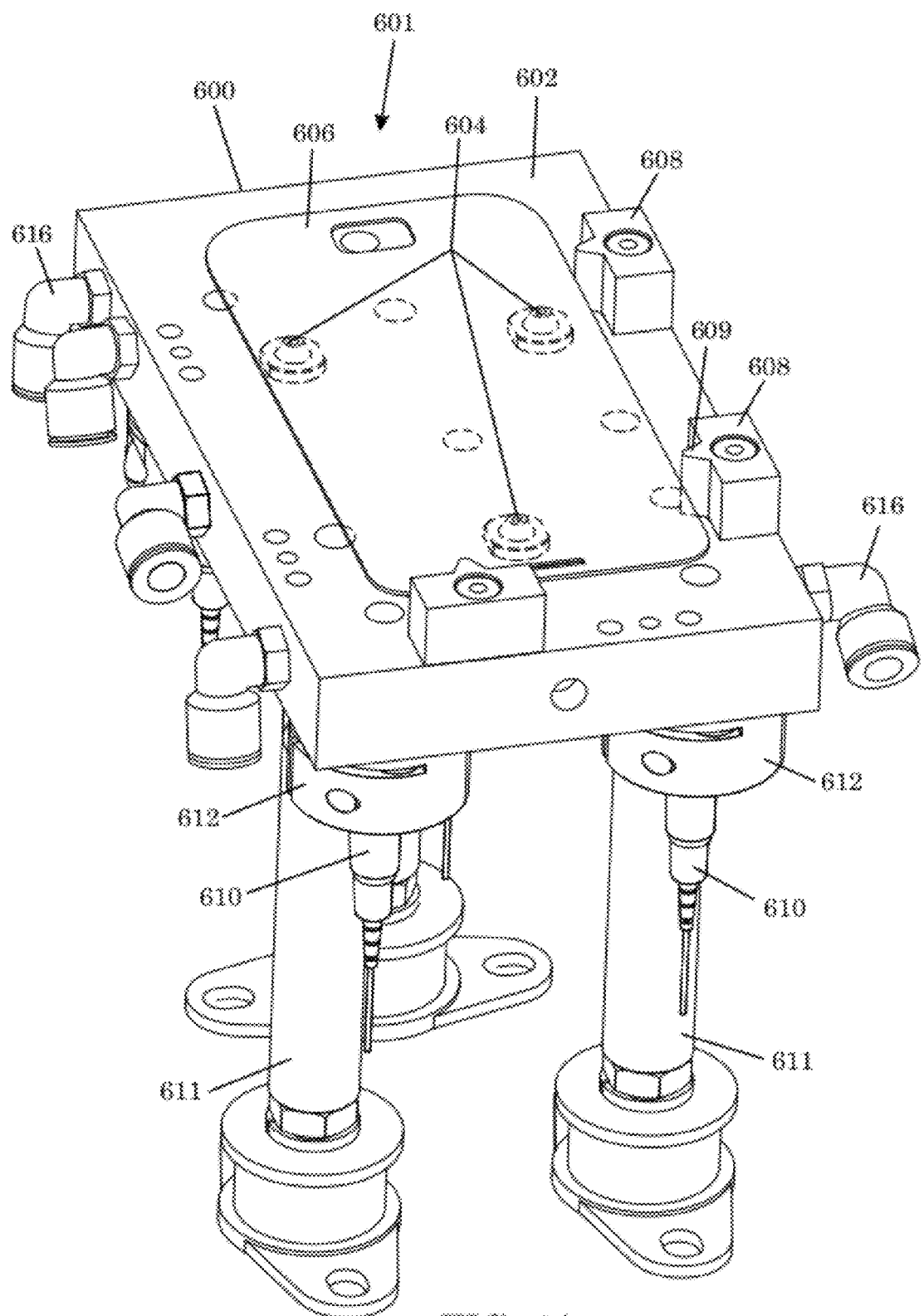
FIG. 6A is a perspective view of a metrology system.

Metrology is an important aspect of determining deviation in shapes of glass articles in order to better control the process of making the glass articles. In one aspect of the invention, a metrology system is provided that measures quickly and accurately a discrete set of points on a glass article. In one embodiment, as shown in FIG. 6A, the metrology system 601 includes a mounting block 600 having a flat top surface, or measurement surface, 602. Supports 604 are attached to the measurement surface 602 and are provided to support a glass article to be measured, such as glass article 606. In one embodiment, at least three supports 604 are attached to the measurement surface 602 to provide at least three contact points for the glass article 606. The supports 604 are arranged to form a stable structure for supporting the glass article in a plane parallel to the measurement surface 602. For example, in FIG. 6, the three supports 604 are arranged in a triangle that is large enough to stably support the glass article. The supports 604 may be truncated cone supports, with the truncated end set to a minimum required to provide a stable structure and minimize the contact area between the supports 604 and the glass article 606.

Alignment guides 608 are attached to the measurement surface 602 at locations outside of the support structure formed by the supports 604. In one embodiment, the alignment guides 608 are arranged to form a corner that will engage a corner of a glass article 606 placed on the supports 604. The alignment guides 608 thus serve as a reference datum for placing a glass article on the supports 604 so that measurements can be made consistently using the system. The alignment guides 608 engage the glass article 606 via tabs 609, which are pointed or truncated or otherwise shaped to minimize the contact area between the alignment guides 608 and the glass article 606. The mounting block 600 sits on top of legs 611. Preferably, legs 611 can be adjusted such that the mounting block 600 is tilted at two angles such that the glass article 606 tends to slide with the aid of gravity into slight contact with tabs 609. The angles are typically less than 5 degrees.

Figure 6B:
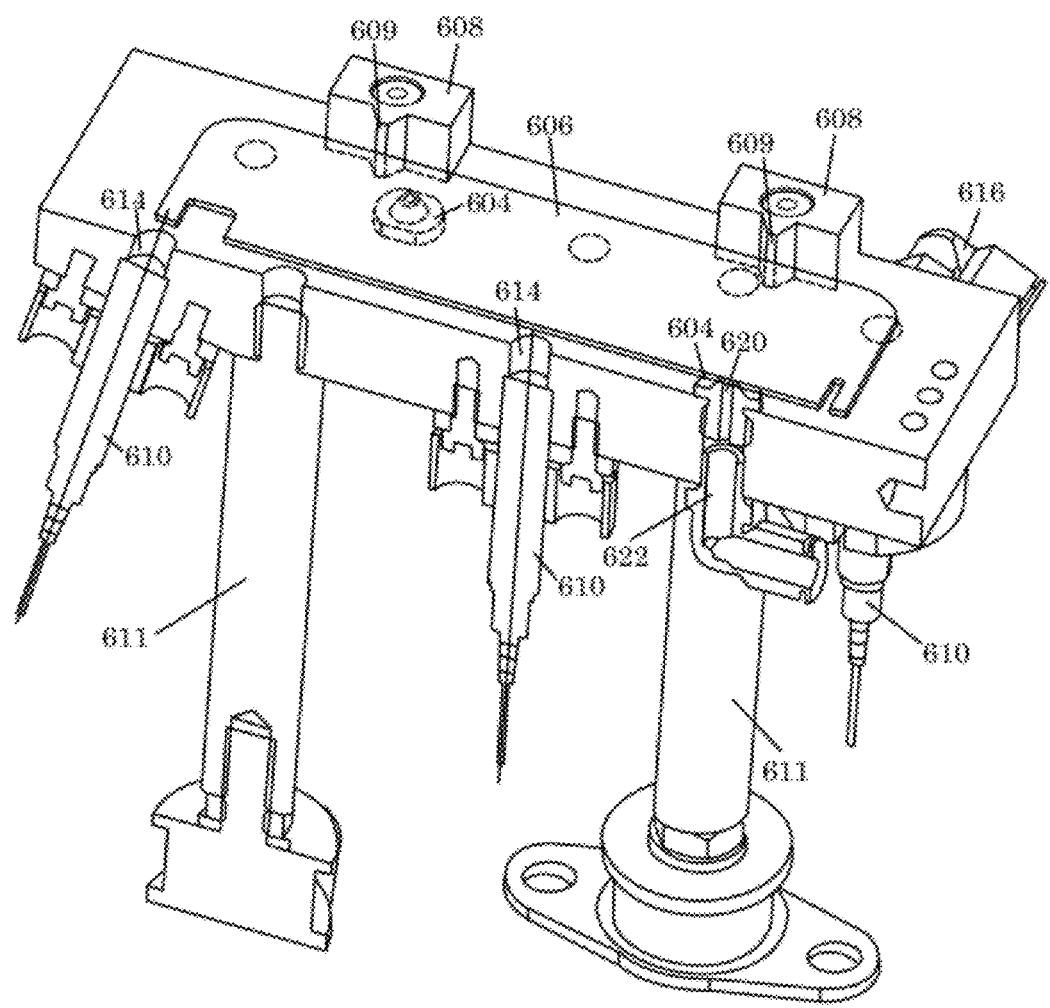
FIG. 6B is a cross-section of the metrology system shown in FIG. 6A.

Below the bottom surface of the mounting block are laser gauges 610. The laser gauges 610 are secured to the mounting block 600 via clamping rings 612. The clamping rings 612 grip the laser gauges 610 like a collet when a screw is tightened. The clamping rings 612 allow the laser gauges 610 to be moved slightly along their axes prior to tightening. The clamping rings 612 also keep the laser gauges 610 rigidly connected to the mounting block 600 after they have been tightened such that there is no looseness that would cause error in reading the position of the glass. As shown in FIG. 6B, the laser gauges 610 are inserted in holes 614 in the mounting block 600. Laser air purge fittings 616 mounted on the sides of the mounting block 600 are in communication with the holes 614 through cross-drilled holes in the mounting block 600. The laser air purge fittings are used to supply clean gas flow, such as air flow, to the holes 614 in order to purge from the holes 614 any particles that may have fallen into the holes 614 and onto the top of the laser gauges 610.

The mounting of the laser gauges 610 may be such that their measurement directions are perpendicular or inclined to the measurement surface 602 and intersect discrete points on the glass article 606. At least one laser gauge 610 is needed to make measurements at a discrete point on the glass article 606. Where multiple laser gauges 610 are used, each laser gauge 610 would be responsible for one discrete point on the glass article 606. The laser gauges 610 operate by launching laser light at the glass article 606 and detecting the reflected light from the glass article 606. The measurements made by the laser gauges 610 are recorded in a suitable medium, such as an electronic data storage, and processed by a computer. A program on the computer takes the measurements made by the laser gauges 610 and computes the distances between the discrete points on the glass article 606 and the laser gauges 610, or another reference datum, along the measurement directions of the laser gauges 610. The measured distances are compared to target distances, which would have been determined for an ideal glass shape either using the same metrology system or by computer modeling. Any deviations in the measured distances from the target distances are stored in a suitable medium, such as an electronic data storage, and later used to improve the process, e.g., to control mold cooling or removal of heat from the radiation emitter body.

In FIG. 6B, an axial hole 620 is drilled through each of the supports 604. Vacuum pressure is transmitted to the axial holes 620 using vacuum fittings 622 and cross-drilled holes (not shown) in the mounting block 600. The vacuum pressure is used to clamp the glass article 606 to the supports 604 while measurement is being taken. Before the glass article 606 is clamped to the supports 604 by vacuum pressure, a slight positive air pressure can be pushed through the axial holes 620 to lift the glass article off the supports 604. This would eliminate all friction between the glass article 606 and the supports 604 and allow the glass article 606 to positively rest against the tabs 609 of the alignment guides 608. Then, the vacuum pressure can be subsequently applied to clamp the glass article 606 to the supports 604. If the glass article 609 is not floated against the tabs 609, an operator would have to be relied on to positively locate the glass article 606 against the tabs 609. Using positive air pressure to float the glass article 606 into place can help eliminate operator error.

Figure 6C:
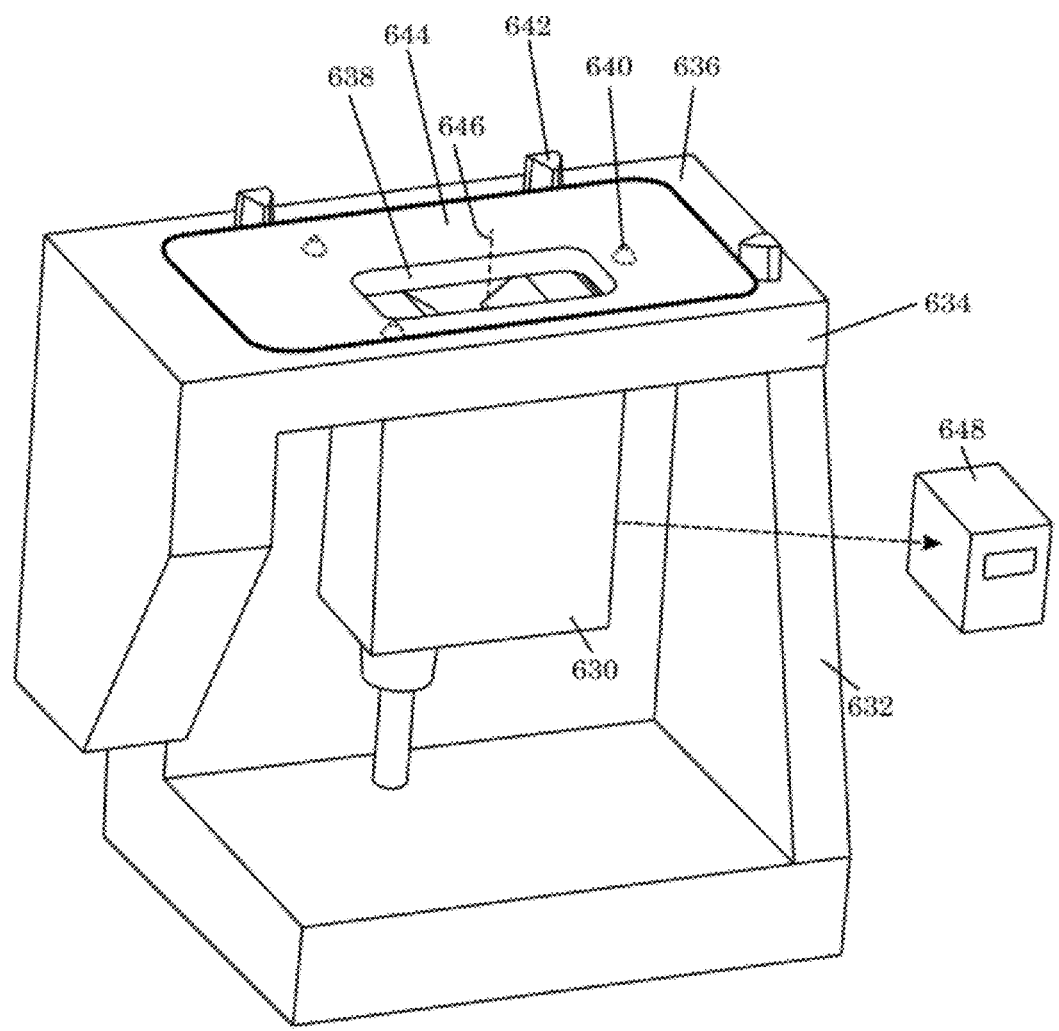
FIG. 6C is a perspective view of another metrology system.

FIG. 6C shows another metrology system that measures points on a glass article. The metrology system includes a displacement gauge 630 mounted to a fixture 632. The fixture 632 has a mounting block 634, which provides a measurement surface 636 (similar to measurement surface 602 in FIG. 6A). The displacement gauge 630 is mounted below a window 638 in the mounting block 634 and makes measurements through the window 638. Supports 640 (similar to supports 604 in FIG. 6A) and alignment guides 642 (similar to alignment guides 608 in FIG. 6A) are arranged on the measurement surface 636 for placement of a glass article 644 relative to the measurement surface 636. The alignment guides 642 or glass article 644 may be arranged such that the portion of the glass article 644 to be measured is approximately centered with the window 638.

Preferably, the displacement gauge 630 uses a non-contact displacement sensor to make measurements. A non-contact displacement sensor is preferred for the metrology system because it will not involve physical contact with the glass article that may deform the glass article as the measurement is taken. Several different types of non-contact displacement sensors may be used. A laser triangulation sensor is one example and operates by measuring the position where a laser line contacts or reflects off a surface. Clear or highly reflective materials like glass are configured to reflect the laser directly back into the sensor (specular reflection). Non-specular materials are configured with the laser orthogonal to the surface, and the sensor detects the diffuse reflection from the surface. Examples of laser triangulation sensors are available as LK series sensors from Keyence and optoNCDE series sensors from Micro-Epsilon.

Another example of a non-contact displacement sensor is a spectral interference laser displacement sensor, which operates by measuring the interference of broad wavelength light reflected off a reference surface and target surface. The spectral content of the returned signal is spread spatially using a diffraction grating and the resulting signal is imaged on a CCD. The interference pattern is analyzed to extract displacement data. Depending on the distance from the reference to target, the various spectra will interfere either by adding the reference and target signals together or canceling the reference and target signals out or somewhere in between. Examples of spectral interference laser displacement sensors are available as SI-F series sensors from Keyence.

Another example of a non-contact displacement sensor is a confocal chromatic displacement sensor. In this sensor, two lenses (or curved mirrors) are arranged confocally to one another with their focuses matching. With the confocal chromatic measuring principle, white light is split into different spectra by lenses and focused on an object through a multilens optical system. The lenses (or curved mirrors) are arranged such that the light is broken down by controlled chromatic aberration into monochromatic wavelengths depending on the displacement. Examples of confocal chromatic displacement sensors are available as confocal DT series sensor from Micro-Epsilon.

Although a non-contact displacement sensor is preferred for use in the displacement gauge 630, it is possible that a contact displacement sensor can also be used. The contact displacement sensor will preferably make measurements with a very low force that would not distort the article being measured. A linear variable differential transformer (LVDT) position sensor is one example of a contact displacement sensor that could be used.

In one embodiment, the displacement gauge 630 uses a laser triangulation sensor to make measurements. The measurement axis of the displacement gauge 630 is generally along line 646. The measurements are made by operating the displacement gauge 630 to direct a laser light to a point near the center of the glass article 644. The light strikes the glass article 644 and is reflected back to the displacement gauge 630. The sensor in the displacement gauge 630 detects the reflected light. The sensor output is transmitted to a laser readout machine 648. The displacement gauge 630 may communicate with the laser readout machine 648 via a wired or wireless connection. The laser readout machine 648 displays the displacement measurement from the sensor. The laser readout machine 648 may also store the measurement for later use or transmit the measurement to another system.

The metrology system may be used to measure deviation of a glass shape from an ideal. In one example, the system is used to measure deviation of a flat section of a glass article from the ideal. For this example, a flat glass article with sub-micron flatness is initially placed on the fixture 632 and the laser displacement gauge 630 is zeroed. Instead of zeroing the laser displacement gauge 630, the response of the laser displacement gauge 630 to the flat glass article may be simply recorded. Then, any successive glass article may be placed on the fixture 632, and the displacement reading measured by the laser displacement gauge 630 will correspond to the flatness of the glass article.

Figure 6D:
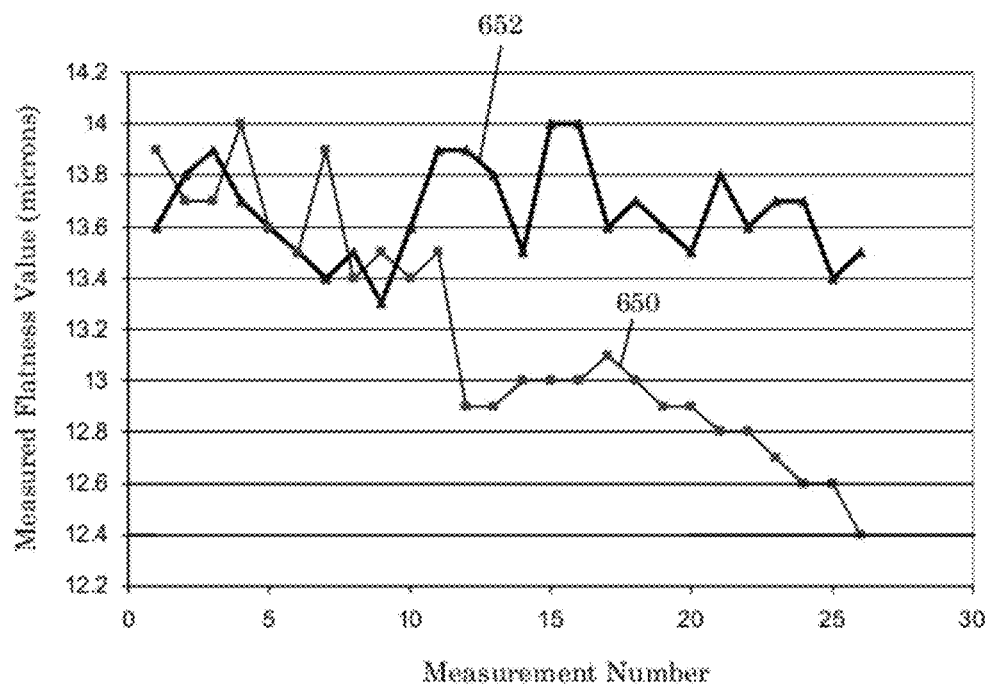
FIG. 6D is a graph showing repeatability of measurements made by the metrology system of FIG. 6C.

FIG. 6D shows a graph of repeatability test data collected using the system of FIG. 6C. For the data shown in the graph, a single piece of glass article was repeatedly loaded onto the fixture 632 by hand, and measurements were recorded. The flatness value of the glass article was found by placing a reference glass article with flatness less than 1 micron onto the fixture 632 and zeroing the laser displacement gauge 630. The duration of the test was 30 minutes. If the laser gauge was zeroed only once at the start of the test period, then significant drift in the reading occurred over time, as shown by the line 650. However, if the reference glass article was placed back on the fixture 632 and the laser gauge was re-zeroed before every reading during the test period, then the repeatability of the measurement was within 0.7 micron, as shown by the line 652.

In another example, the metrology system is used to measure deviation of a curved section of a glass article from the ideal. In this case, a reference 3D shape is placed on the fixture 632 and the response of the laser displacement gauge 630 to the reference 3D shape is recorded. The displacement reading measured by the laser displacement gauge 630 for any subsequent 3D shapes can be compared to the displacement reading for the reference 3D shape.

Figure 6E:
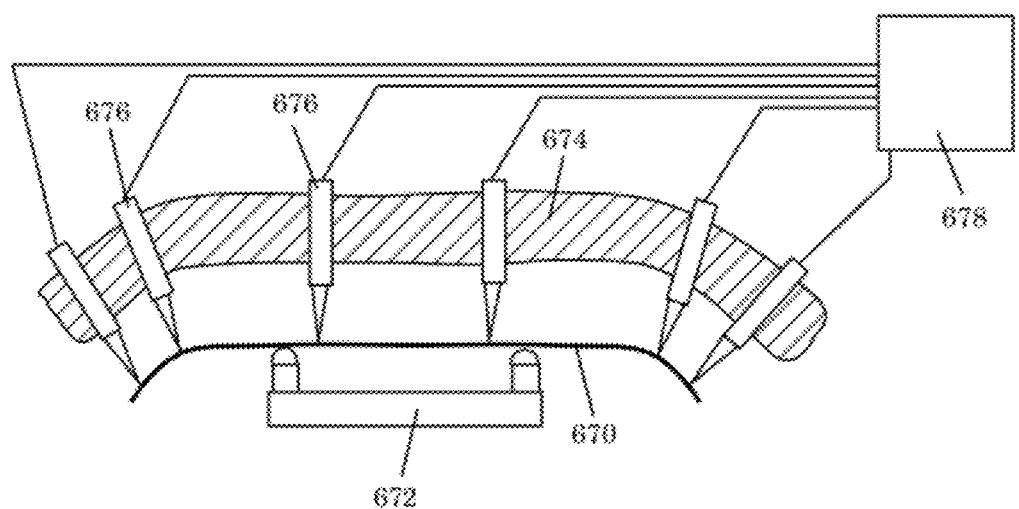
FIG. 6E is a partial cross-section of another metrology system.

FIG. 6E shows another metrology system that measures the displacement of points on a glass article 670. The glass article 670 is supported on a glass support fixture 672. Above the glass support fixture 672 is a probe support fixture 674. Displacement gauges 676, which may employ any of the sensors described above, are supported in and along the probe support fixture 674. The displacement gauges are in opposing relation to the glass article 670. Each displacement gauge 676 will be responsible for measuring a distance between a point on the glass article 670 and the displacement gauge 676, i.e., displacement of a point on the glass article 670. Signals from the displacement gauges 676 can be collected by a measurement module 678, which may process the signals to determine the shape of the glass article 670, e.g., using a processor. The measurement module 678 may output the measured shape to a system for controlling the shape of a glass article. The measurement module 678 may additionally compare the measured shape to a reference shape and output information about deviation of the measured shape from the reference shape to the system for controlling the shape of a glass article. Such a system will be described in more detail below.

Figure 7A:
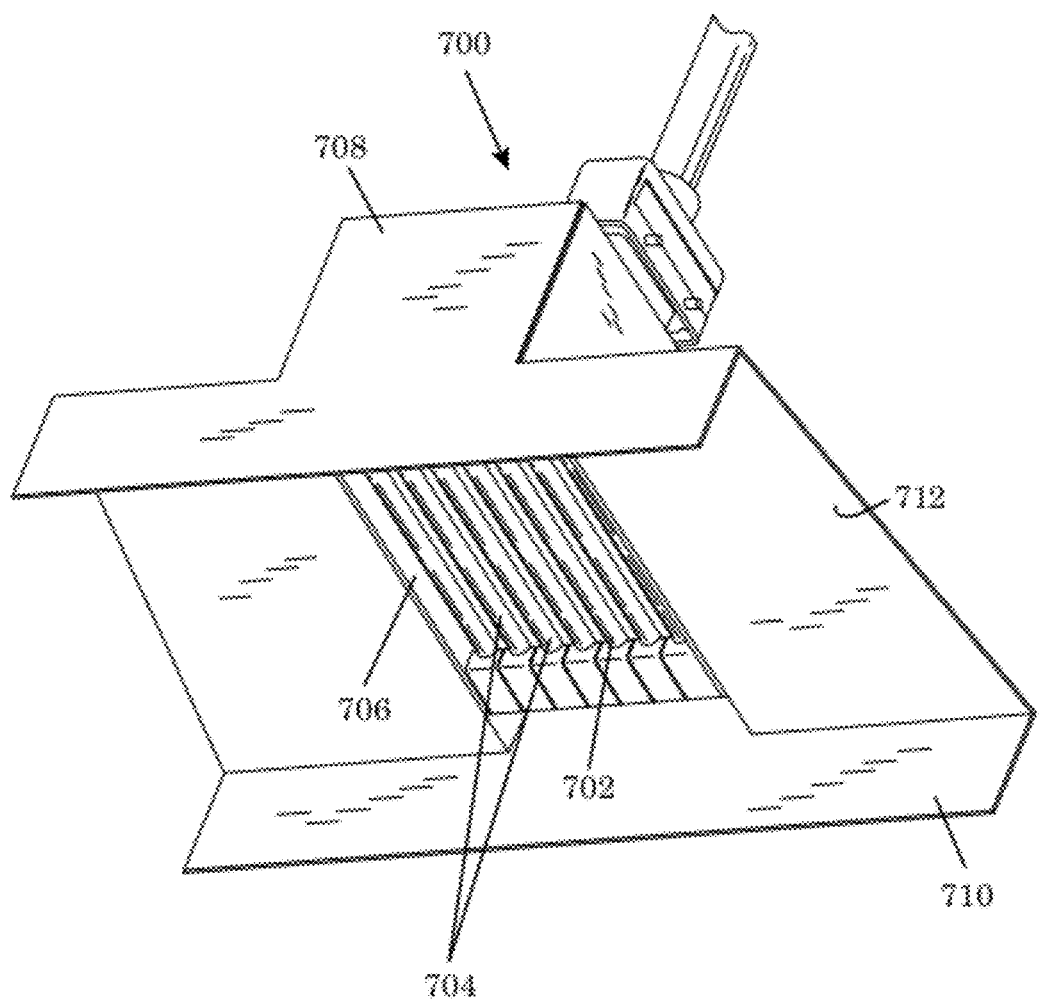
FIG. 7A is a perspective view of a preheating module.
Figure 7B:
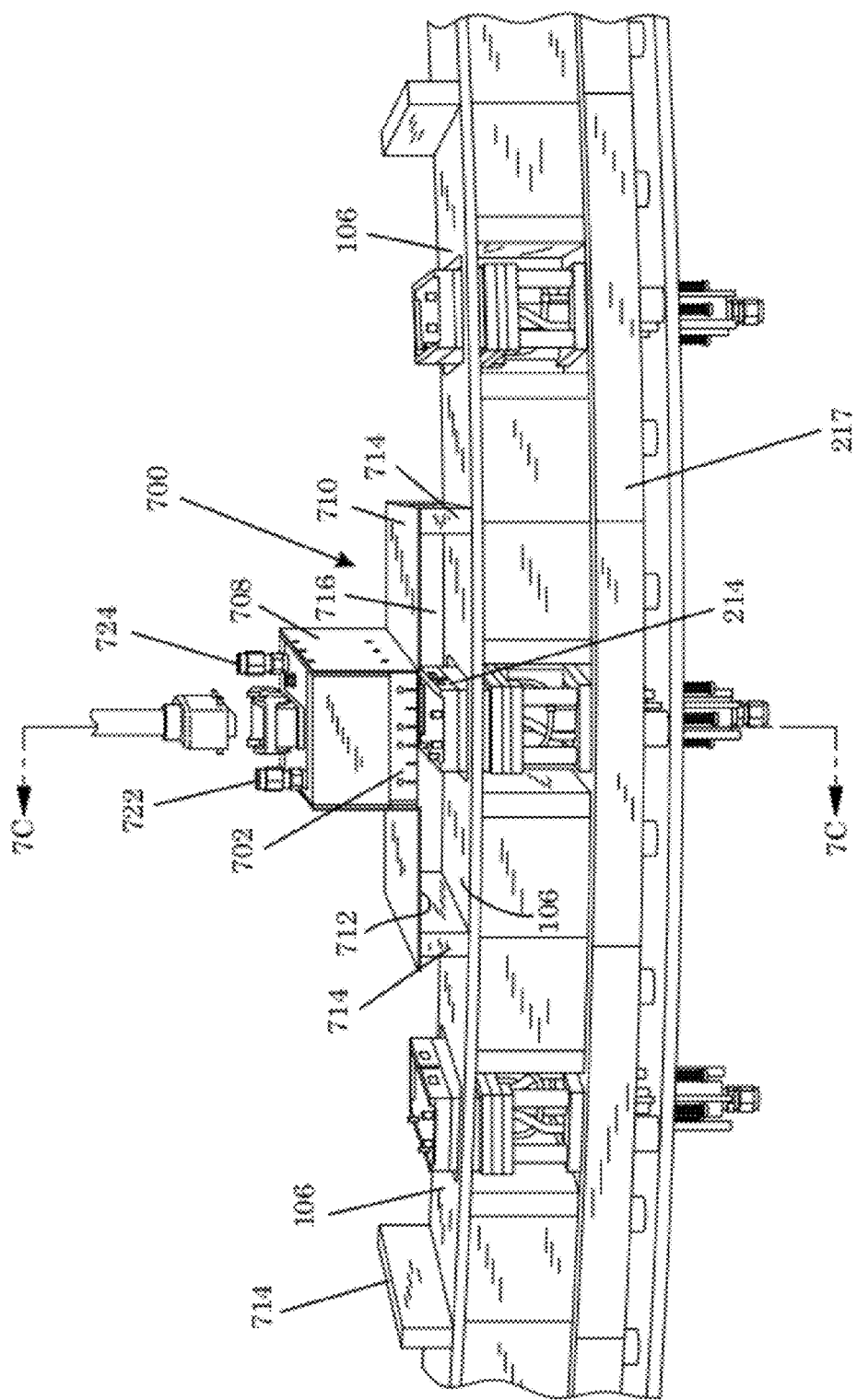
FIG. 7B is a section of a glass molding system with the preheating module of FIG. 7A.

Returning to FIG. 1, cycle time may be improved by preheating the mold 108 before a 2D glass sheet is placed on the mold 108 and the mold 108 is indexed into any of the HT modules 110. In one aspect of the invention, a heating system for preheating a mold is provided. In one embodiment, in FIG. 7A, a heating module 700 for preheating a mold includes a heater assembly 702, which includes an array of radiant heaters 704 that operate in the infrared range. The heater assembly 702 is mounted within a cavity 706 of a shield box 708. The shield box 708 largely blocks high intensity light and heat from emanating out of the heating module 700 to where the light and heat could be dangerous to human operators. The base 710 of the shield box 708 has a slot 712. When the heating module 700 is mounted for use, as shown in FIG. 7B, the top of the indexing table 104 extends through and is translatable relative to the slot 712.

Fences 714, made of refractory material, are provided on the top of the indexing table 104. The space between each adjacent pair of fences 714 defines one of the stations 106. When a station 106 is indexed with the heating module 700, the fences 714 adjacent the station 106 close the open sides of the slot 712 of the shield box 708. A chamber 716 is then defined between the fences 714, the heater assembly 702, and the indexing table 104. Mold 214 to be heated by the heater assembly 702 is inserted into the chamber 716 via the mold support system described above. In this position, the heater assembly 702 can be operated to deliver very intense heat flux that can boost the temperature of the mold 214 quickly during a single index dwell of the system. In one embodiment, the bulk temperature of the mold is boosted by at least 40° C. in a single index dwell. Typically, the bulk temperature of the mold is boosted by up to 100° C. in a single index dwell. An index dwell is a time period in which the indexing table is stationary and stations are indexed with HT modules. The advantage of preheating the mold is that the time required to heat the mold to forming temperature when the glass is in placed on the mold and indexed into the HT modules would be reduced, which would reduce cycle time.

Figure 7C:
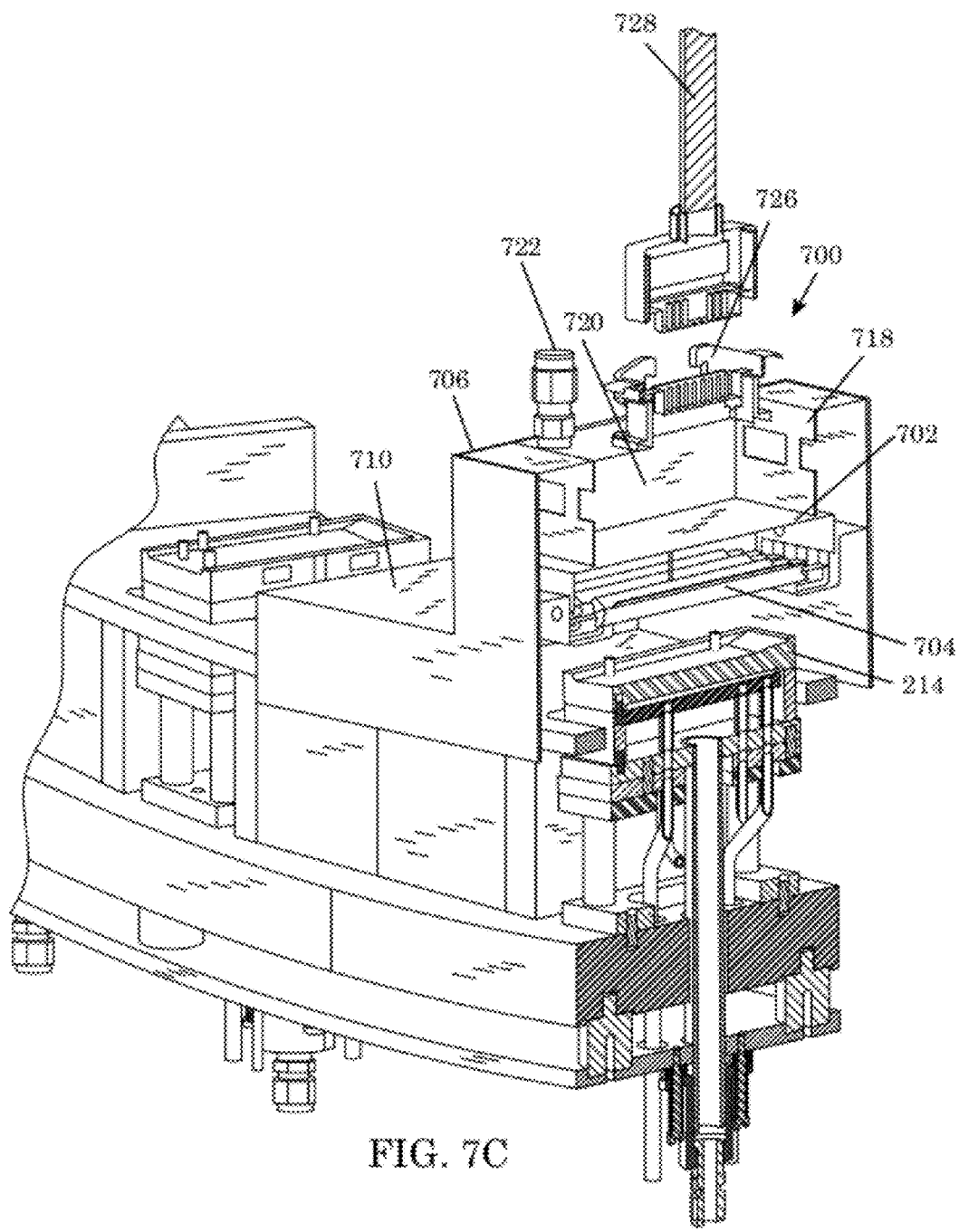
FIG. 7C is a cross section of FIG. 7B along line 7C-7C.

FIG. 7C shows an electrical connector 726 at the top of the heating module 700. The electrical connector 726 is coupled to the heater assembly 702 and may be connected to the cable 728 to allow delivery of electrical power to the heater assembly 702. FIG. 7C also shows a cooling unit 718 mounted above the heater assembly 702. The cooling unit 718 can be operated to maintain the heater assembly 702 at a safe temperature. The cooling unit 718 may include a chamber 720 through which cooling fluid is circulated, with appropriate fittings 722, 724 (also see FIG. 7B) for supplying fluid to and withdrawing fluid from the chamber 720. The cooling fluid is preferably water, although air or other cooling fluid, gas or liquid, may be used.

The infrared heater assembly 702 may be replaced with an induction heater. The induction heater can be made of one or more electrodes that can be energized to generate a high-frequency electromagnetic (EM) field. The EM field would create eddy electrical currents in the mold that will resistively heat the mold. The inductive approach can enable the temperature of the mold 214 to be raised even faster than the infrared heating approach. For uniform heating of the mold, the electrode(s) should be shaped or positioned above the mold 214 such that there is a substantially uniform gap between the electrode(s) and the mold surface.

The 2D glass sheets that can be formed into 3D glass articles will depend in part of the desired attributes of the 3D glass articles. For 3D glass cover applications, high strength and resistance to damage are important. Typically, the requirements of these applications can be met by ion-exchangeable glasses. Ion-exchangeable glasses are characterized by the presence of small alkali metal or alkaline-earth metal ions that can be exchanged for larger alkali or alkaline-earth metal ions during an ion-exchange process. Typically, ion-exchangeable glasses are alkali-aluminosilicate glasses or alkali-aluminoborosilicate glasses. Specific examples of ion-exchangeable glasses are disclosed in U.S. Pat. No. 7,666,511 (Ellison et al; Nov. 20, 2008), U.S. Pat. No. 4,483,700 (Forker, Jr. et al.; Nov. 20, 1984), and U.S. Pat. No. 5,674,790 (Araujo; Oct. 7, 1997); U.S. patent application Ser. No. 12/277,573 (Dejneka et al.; Nov. 25, 2008), Ser. No. 12/392,577 (Gomez et al.; Feb. 25, 2009), Ser. No. 12/856,840 (Dejneka et al.; Aug. 10, 2010), Ser. No. 12/858,490 (Barefoot et al.; 18 Aug. 18, 2010), and Ser. No. 13/305,271 (Bookbinder et al.; Nov. 28, 2010); and U.S. Provisional Patent Application No. 61/503,734 (Dejneka et al.; Jul. 1, 2011).

The general procedure for making glass articles includes supporting a mold at a station and indexing the station with the heating module 700 (in FIGS. 7A-7C) so that the mold can be preheated. Within the same time frame, 2D glass sheets are preheated at the loading area 118 (in FIG. 1). After the mold is preheated, a preheated 2D glass sheet is loaded onto the mold and the mold and 2D glass sheet are translated into a first sequence of HT modules 110 (in FIG. 1). These HT modules 110 will be operating in the heating mode so that the 2D glass sheet can be heated to a temperature at which it is soft enough to be conformed to the mold surface to form a 3D glass article, typically a temperature between the annealing point and softening point of the glass. Force may be used to conform the 2D glass sheet to the mold surface. The mold and 3D glass article are then translated through a second sequence of HT modules 110 operating in the cooling mode so that the 3D glass article can be cooled down to a temperature at which it can be handled, typically to a temperature below the strain point of the glass. From the second sequence of HT modules operating in the cooling mode, the mold and 3D glass article are translated to the unloading section of the system, where the 3D glass article is unloaded from the mold. The mold is then cycled again through the system. For continuous production of glass articles, molds are placed on stations of the system until all the stations are filled with molds. Each mold will experience the same cycle described above until it emerges in the unloading section with a 3D glass article.

Figure 8:
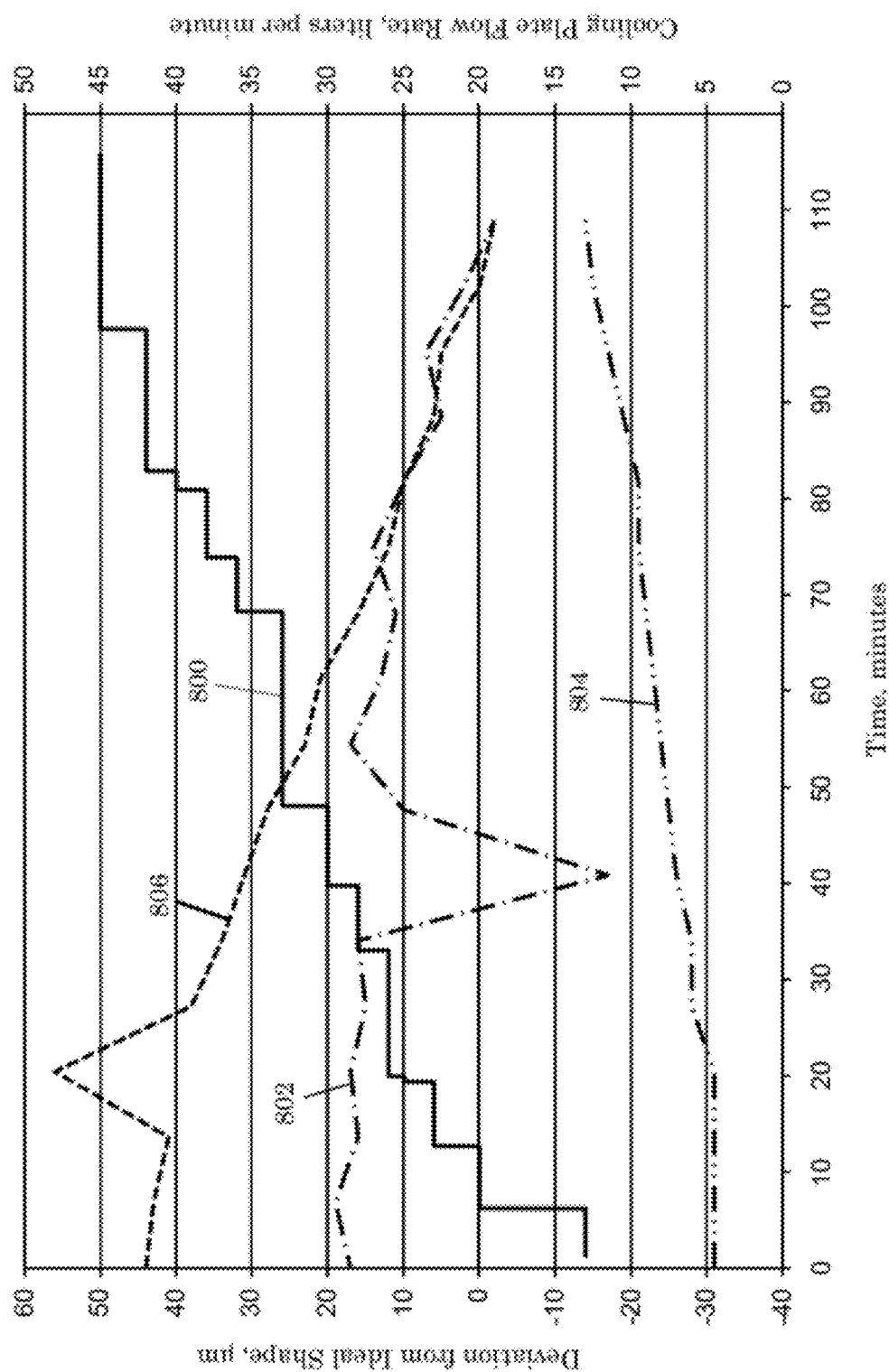
FIG. 8 is a graph showing the effect of changing cooling plate flow on the shape of a 3D glass article, as measured by the metrology system of FIGS. 6A and 6B.

The 3D glass articles and molds are tracked so that the mold that produces each 3D glass article is known. The shape of each 3D glass article is then measured, e.g., using the metrology system described above and in FIG. 6. The deviation of the shape of the 3D glass article from an ideal shape is determined. If the deviation is not within acceptable limits, measures are taken to improve the shape. Measures may be taken to improve the shape even if the deviation is within acceptable limits, i.e., in order to get as close to the perfect shape as practical. One measure that could be taken is active control of the temperature of the mold that is producing the deviant 3D glass article. Typically, the best approach is to control the temperature of the mold at the time when the force that is used to hold the 3D glass article against the mold is released. This occurs after the glass has been conformed to the mold. It is assumed that if the glass has conformed to the mold and has not bonded to the mold, then the remaining mechanism by which the glass can warp, and hence lose shape, are thermal gradients in the glass when holding force is released. The thermal gradients in the glass can be controlled through the temperature of the mold. The deviation of the shape of the 3D glass article produced by the mold previously will provide the clue as to how much cooling of the mold would be needed in order to subsequently produce a 3D glass article with the correct shape. The amount of heat to remove from the mold will vary from one mold to the next due to variations in heat transfer properties of the mold, as already discussed above. Therefore, it will be important to measure the 3D glass article produced by each of the molds being cycled through the system in order to determine how to adjust the temperature of each of the molds. FIG. 8 is a graph showing how the shape of the 3D glass article responds to adjustment of mold cooling flow over several cycles. Line 800 represents the cooling plate flow. Lines 802, 804, 806 represent different points on the glass. As the cooling plate flow is adjusted to change the mold temperature, the shape of the glass approaches the ideal, i.e., where deviation is nearly zero.

Figure 9A:
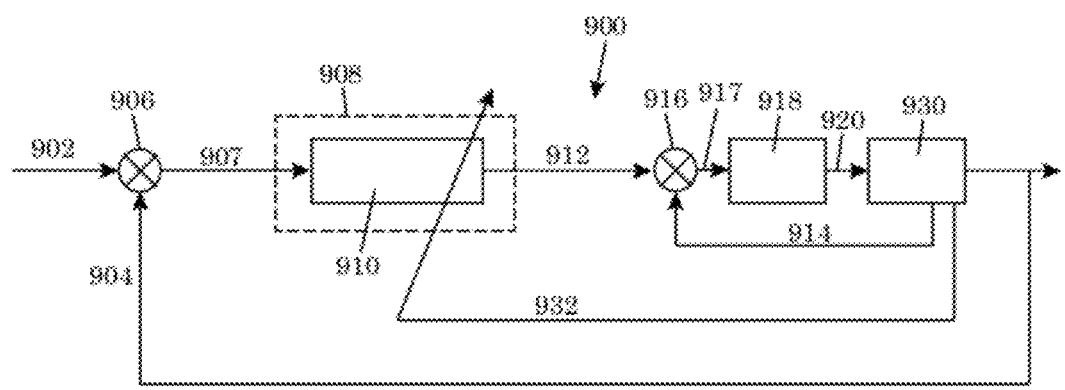
FIG. 9A is a block diagram of a system for controlling glass shape.
Figure 10A:
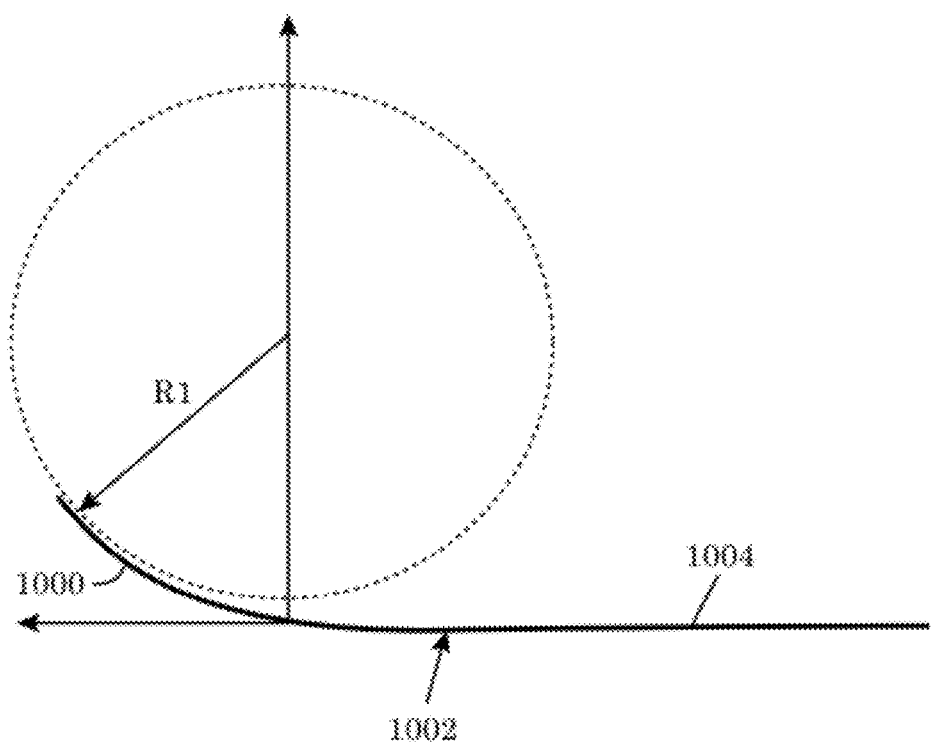
FIG. 10A is a schematic of a shape defining metric.
Figure 10B:
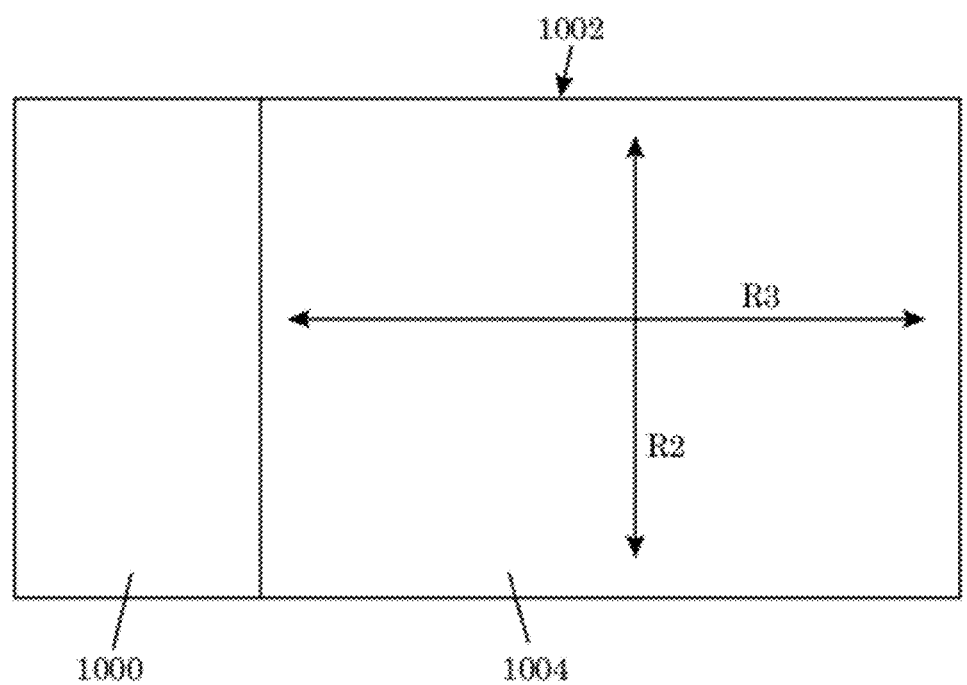
FIG. 10B is another schematic of shape defining metrics.

FIG. 9A shows a system 900 for controlling the final shape of a 3D glass article. In control system 900, the ideal shape of the 3D glass article 902 and the measured shape of the 3D glass article 904 are received at a summing point 906. The ideal and measured shapes provided to the summing point can each be cast in terms of a set of shape metrics. FIGS. 10A and 10B show examples of shape metrics that could be measured and used to characterize the shape of the 3D glass article. In FIG. 10A, shape metric R1 represents the radius of curvature of a bend formed in a bend section 1000 of the 3D glass article 1002. In FIG. 10B, shape metrics R2 and R3 represent the radii of curvatures in a flat section 1004 of the 3D glass article 1002. A combination of R2 and R3 may be another metric. The shape metrics shown in FIGS. 10A and 10B can be manipulated using process parameters. One such process parameter is the mold temperature. The shape characteristics measured and provided to the summing point may be based on one or more of the shape metrics described above or on a different set of shape metrics. The shape measurements may be obtained from any of the metrology systems described above or from a different metrology system not described above.

The difference 907 between the ideal shape 902 and measured shape 904 is fed to a model-based control 908 containing a model 910 that correlates glass shape to cooling flow rate. The output 912 of the model 910 is a target cooling flow rate. The target cooling flow rate 912 and the actual cooling flow rate 914 are received at a summing point 916. The difference 917 between the target cooling flow rate 912 and actual cooling flow rate 914 is fed to a flow controller 918, whose output 920 is provided to the system 930. The flow controller 918 could be an off-the-shelf product or a proportional-integral based control scheme. The system 930 includes an associated set of cooling plate and mold (400, 214 in FIG. 5A). The cooling plate adjusts the temperature of the mold using the mechanism already described above. Also, the mold temperature is measured and used to update the model 910, as shown by the arrow 932. The mold temperature may be measured using a pyrometer installed at the exit of the process. The measured mold temperature will account for any emissivity changes of the mold. The feedback 904 shows that the shape of the 3D glass article that is formed by the mold of the system 930 is measured and returned to the summing point 906.

Figure 9B:
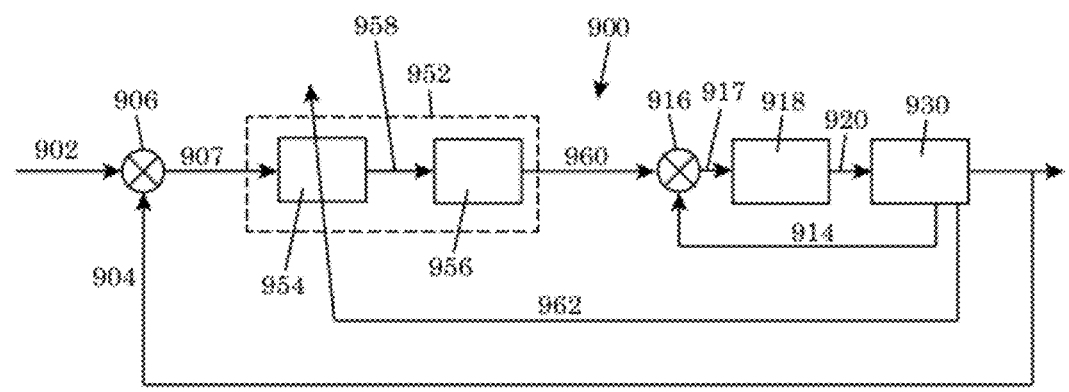
FIG. 9B is a block diagram of another system for controlling glass shape.

FIG. 9B shows another system 950 for controlling the final shape of a 3D glass article. The control system 950 of FIG. 9B is similar to the control system 900 of FIG. 9A, with the exception that the model-based control 952 contains two models 954, 956. In FIG. 9A, the model-based control 908 had only model 910. In FIG. 9B, model 954 correlates glass shape to mold temperature, and model 956 correlates mold temperature to cooling flow rate. In this case, the difference 907 between the ideal shape 902 and measured shape 904 are fed to the model 954. The output 958 of the model 954 is then fed to the model 956. The output 960 of model 956 is the target cooling flow rate and is received at the summing point 916 along with the actual cooling flow rate 914. The remainder of the process continues as described above, except that only the model 954 is updated with information about the mold temperature, as indicated by arrow 962. The control system 950 can be used when it is difficult to determine a direct relationship between shape and cooling flow rate.

Figure 11A:
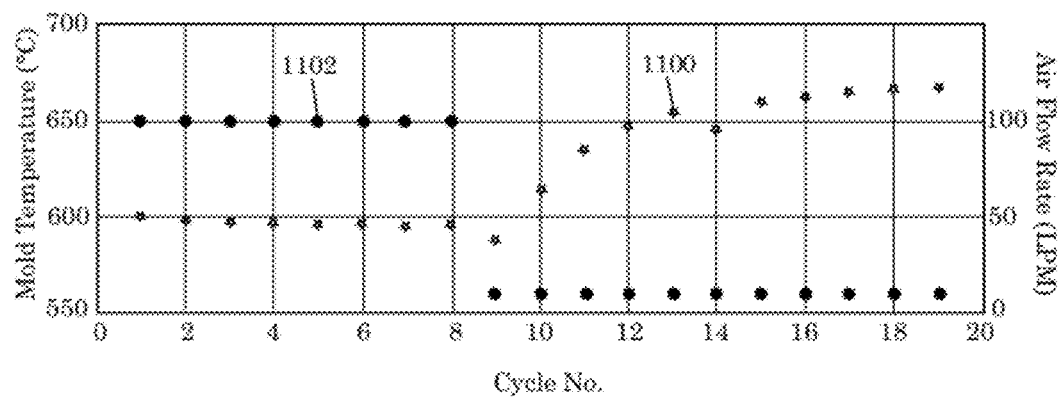
FIG. 11A is a graph showing influence of air flow rate on mold temperature.
Figure 11B:
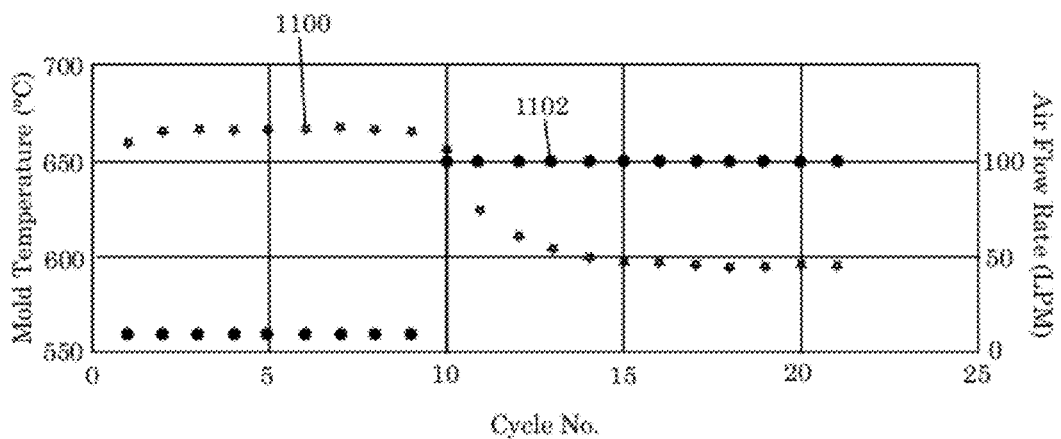
FIG. 11B is another graph showing influence of air flow rate on mold temperature

The models can be developed using experimental data. For example, FIG. 11A shows change in mold temperature for a change in cooling flow rate from a maximum to a minimum. FIG. 11B shows change in mold temperature for a change in cooling flow rate from a minimum to a maximum. In FIGS. 11A and 11B, the stars 1100 represent the mold temperature, and the circles 1102 represent the cooling flow rate. The cooling fluid for the data shown in FIGS. 11A and 11B is air. From the data shown in FIGS. 11A and 11B, a cooling flow rate to mold temperature model can be determined. An inverse of this model will yield a mold temperature to cooling flow rate model. One of the ways the model could be formulated as a first-order-plus-dead-time (FOPDT) model. However, care should be taken to determine the model parameters over a narrow operating range primarily due to the high non-linearity of the process. The derivation below is an example of how such a model could be developed.

Any FOPDT model can be formulated as:

$$Y(s) = \frac{Ke^{-T_d s}}{(1+sT)} U(s) \quad (1)$$

where $Y(s)$ is the Laplace transformation of the output (mold temperature), $U(s)$ is the Laplace transformation of the input (cooling flow rate), K is the process gain (defined as the ratio of the change in the output to the change in the input), $T_d$ is the dead time (defined as the time it takes for the process to respond to an input change) and T is the process time constant (defined as time it takes for the process to go from the current state to 63% of the next steady-state).

Based on the data shown in FIGS. 11A and 11B, the model parameters obtained are −0.75 for the process gain (negative sign increase in cooling flow rate decreases mold temperature), less than 1 cycle time for the dead time, i.e., approximately 7 minutes, and 1 cycle time for the process constant, i.e., approximately 7 minutes. Hence the cooling fluid rate ($Q_c$) to mold temperature ($T_m$) model is defined as:

$$T_m = \left[\frac{-0.75 e^{-7s}}{(1+7s)}\right] Q_c \quad (2)$$

The other models 910, 954 can be determined using an approach similar to the one described above. However, as mentioned earlier, the model parameters must be determined for a narrow operating region. Multiple model parameters can be generated for multiple operating regions and then model parameters can be switched in real time depending on the current operating region. The control systems 900, 950 may be implemented on a computer or a programmable logic controller. Further, portions of the control systems 900, 950 may be implemented on a computer. For example, the models 910, 954 may be implemented on a computer.

When forming a 2D glass sheet into a 3D glass article, force is applied to the glass in order to conform the glass to the mold. In a preferred embodiment, the forming force is produced by applying vacuum between the mold and glass. The vacuum must be sufficient to force the softened glass into full compliance with the mold surface. In general, this means a vacuum level of over 20 kPa (or 3.5 Psi). After forming is complete, vacuum is maintained to hold the glass in compliance with the mold while forming stresses relax and glass temperature equilibrates. For high strength glasses, the high level of sodium in the glass can react at forming temperatures with the mold surface, creating corrosion and deterioration of the mold surface. This reaction can be intensified by high contact pressure between the hot glass and the mold surface, leading to accelerated deterioration of the mold surface. Since high force is only needed to initially form the glass, the vacuum can be reduced to a level just sufficient to hold the glass against the mold surface once initial forming is complete.

From the above, forming of the glass into a 3D shape involves applying a forming vacuum force to conform the glass to the mold surface and then reducing the forming vacuum force to a holding vacuum force to hold the glass against the mold. Forming generally takes place in less than 20 seconds, while the glass may be held under vacuum for another 40 or more seconds for best warp performance. The reduced force between the hot glass and mold would reduce the reaction between the sodium in the glass and the mold surface. For example, the vacuum may be reduced from 27 kPa to 9 kPa after 25 seconds and then held at 9 kPa for an additional 35 seconds in a two-stage vacuum process. Reduction in vacuum after forming has been shown to significantly increase the number of forming cycles before mold renewal is necessary. Additional step downs in vacuum may be added as needed to create the best balance between holding force and mold life. This principle of stepping down the force applied to the glass after conforming the glass to the mold surface may be used with other methods of applying force to the glass, such as the plunger method.

Figure 12:
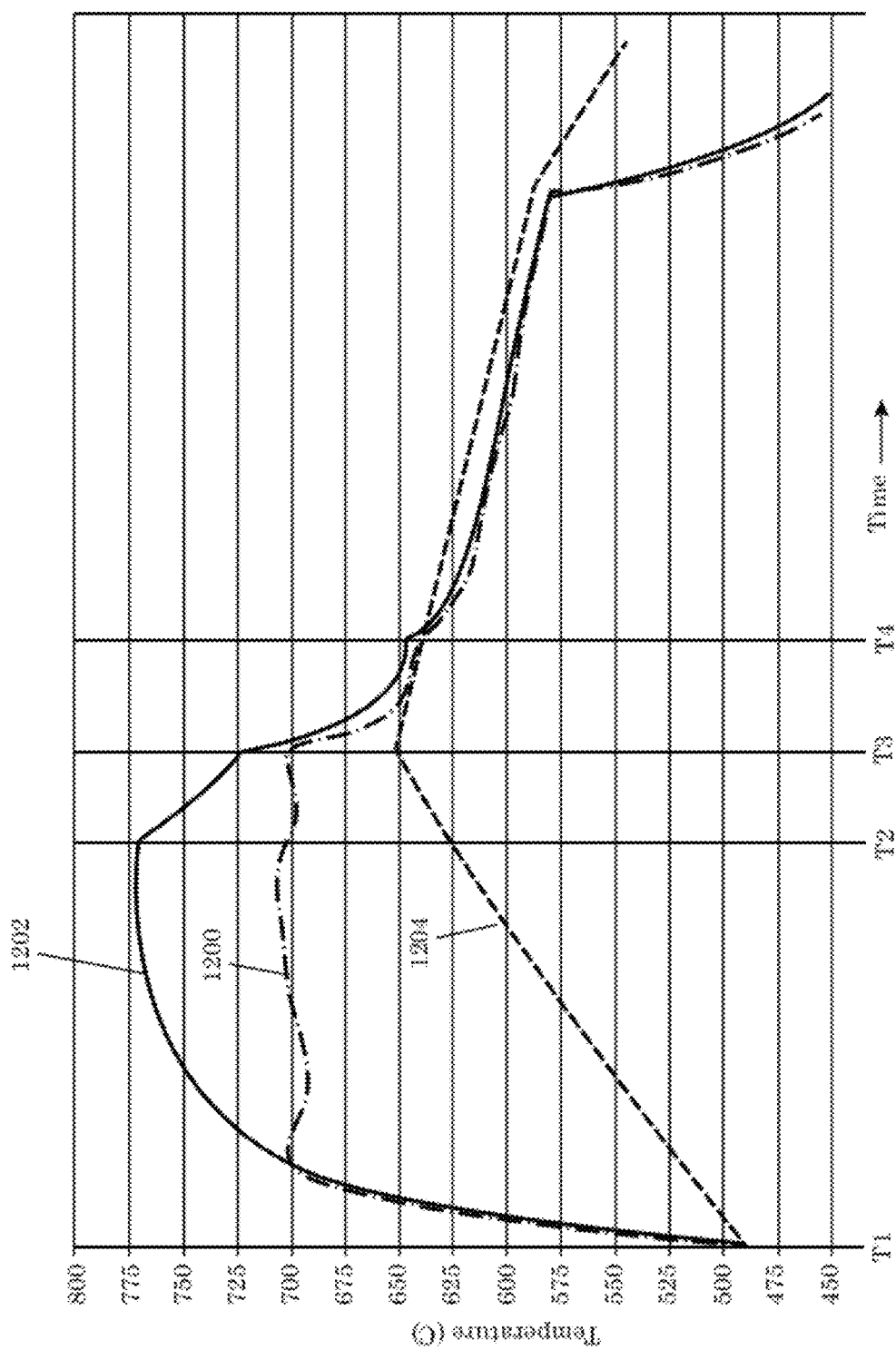
FIG. 12 is a graph illustrating a process of making a 3D glass article.

A process of forming a 3D glass article that minimizes warp in the glass can be explained with reference to FIG. 12. In this figure, the temperature of the portion of the glass that will be flat is indicated at 1200; the temperature of the portion of the glass that will be curved is indicated at 1202; the temperature of the portion of the mold that corresponds to the flat portion of the glass is indicated at 1204. The temperature of the portion of the mold that corresponds to the curved portion of the mold is similar to 904.

Between time T1 and T2, the glass is heated to a forming temperature in a radiative environment, which may be provided by one or more HT modules operating in a heating mode. Preferably, the forming temperature is between the annealing point and softening point of the glass. The mold is heated along with the glass since the glass is on the mold during this time.

At time T2, the glass is at the forming temperature. Between time T2 and T3, while the glass is in the radiative environment, force is used to conform the glass to the mold. The force is produced by applying vacuum between the glass and mold. The radiative source at this stage is generally much hotter than the mold temperature in order to maintain the glass as soft as possible during the forming operation. The mold temperature is generally held at a temperature about 50° C. to 70° C. above the viscoelastic transition region of the glass. While in the radiative environment, the glass will remain at an intermediate temperature between the radiative temperature and the mold temperature and well above the elastic transition. This would allow the bending stresses generated in the glass by forming to relax while the glass remains conformed to the mold. The key is for the majority of the mechanical stresses due to forming to relax by maintaining the glass temperature well above annealing point. Thermal gradients are not important at this time because the glass is soft and stresses due to thermal gradient will relax quickly.

Between time T3 and T4, the glass is held against the mold by force. The holding force is produced by applying vacuum between the glass and mold. Typically, there should be continuity between applications of the forming and holding forces, although the holding force may be reduced compared to the forming force. While continuing to hold vacuum in between the glass and mold, the glass temperature is then matched to that of the mold temperature and made as uniform as possible by indexing the glass and mold into a radiative environment that matches the mold temperature. Ideally, the mold temperature would remain above the annealing point, e.g., by 30° C.-50° C., allowing further relaxation of residual glass bending stresses. At time T4, the mold temperature, glass temperature, and radiative environment temperature are substantially equal and uniform throughout. Thermal gradients in the glass should be near to zero as possible.

Immediately after time T4, vacuum is released from between the glass and mold, even though the glass is still nominally viscoelastic. The only remaining force on the glass would be gravitational, i.e., the weight of the glass itself. This is less than 0.1% of the force applied to form the glass. Given the low applied force and extremely high viscosity of the glass, any additional sag or physical relaxation will be extremely slow, on the order of several minutes.

After the vacuum release, the glass is cooled to the purely elastic zone. This cooling should take place very rapidly, on the order of 2 minutes or less, so that any warp due to thermal gradients generated during cooling will not have time to relax by sagging. When the glass comes to a uniform room temperature, it will then return to the shape determined by the mold. Thermal gradients generated during this rapid cool are relatively unimportant as long as they do not generate stresses high enough for significant viscous relaxation in the time allotted.

While the invention has been described using a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of making glass articles, comprising:
   placing a two-dimensional (2D) glass sheet on a mold having a mold surface with a three-dimensional (3D) shape;
   placing the 2D glass sheet and mold in a radiative environment and heating the 2D glass sheet to a first glass temperature between an annealing point and softening point of the glass and heating the mold to a first mold temperature;
   while in the radiative environment and at the first glass temperature, applying a first vacuum between the glass and the mold thereby conforming the 2D glass sheet to the mold surface by a force to form a 3D glass article;
   maintaining the first vacuum between the glass and the mold and maintaining the glass at a temperature above the elastic transition of the glass for a time sufficient to allow relaxation of a majority of bending stresses generated in the glass by the conforming step;
   reducing the force by decreasing the first vacuum to thereby reduce a contact pressure between the 3D glass article and the mold surface
   holding the 3D glass article against the mold surface by the second vacuum while cooling the 3D glass article to a second glass temperature and the mold to a second mold temperature wherein the second glass temperature and the second mold temperature are above the annealing point of the glass and about the same temperature;
   releasing the second vacuum holding the 3D glass article against the mold surface; and
   rapidly cooling the 3D glass article to a third glass temperature below a strain point of the glass.

2. The method of claim 1, further comprising adjusting at least one process parameter to control the shape of the 3D glass article.

3. The method of claim 2, wherein adjusting at least one process parameter comprises adjusting a temperature of the mold.

4. The method of claim 3, wherein adjusting the temperature of the mold comprises adjusting the cooling rate of the mold.

5. The method of claim 4, wherein adjusting the cooling rate comprises circulating a cooling fluid through a cooling plate, and wherein determining the amount of heat to remove comprises determining a flow rate at which the cooling fluid is supplied to the cooling plate.

6. The method of claim 2, wherein adjusting at least one process parameter to control the shape of the 3D article comprises comparing the difference between an ideal shape and a measured shape determined by a set of shape metrics that defines the characteristics of the shape of the 3D glass article and adjusting the temperature or cooling rate of the mold.

7. The method of claim 6, wherein adjusting at least one process parameter to control the shape of the 3D article further comprises determining an amount of heat to remove from the mold.

8. The method of claim 1, wherein heating the 2D glass sheet in the radiative environment comprises using a radiation emitter body to emit radiation that is absorbed by the 2D glass sheet.

9. The method of claim 1, wherein the radiation emitter body absorbs radiation from at least one radiant heater during heating of the 2D glass sheet in the radiative environment.

10. The method of claim 1, wherein bringing the 3D glass article to the second glass temperature and mold to the second mold temperature comprises using a radiation emitter body to absorb heat from the 3D glass article.

11. The method of claim 10, further comprising removing heat from the radiation emitter body while the radiation emitter body is absorbing heat from the 3D glass article.

12. The method of claim 10, further comprising selectively delivering heat to the radiation emitter body to maintain the radiation emitter body at the second glass temperature while the radiation emitter body is absorbing heat from the 3D glass article.

13. The method of claim 1, further comprising separately preheating the 2D glass sheet and mold prior to placing the 2D glass sheet on the mold.

14. The method of claim 1, wherein the second mold temperature is about the same as the first mold temperature.

15. The method of claim 1, wherein the second mold temperature is lower than the first mold temperature.

16. The method of claim 1, wherein the first mold temperature is above the glass annealing point temperature.

* * * * *